United States Patent
Seiberle et al.

(10) Patent No.: US 11,048,033 B2
(45) Date of Patent: Jun. 29, 2021

(54) ENCRYPTED OPTICAL SECURITY DEVICE

(71) Applicant: ROLIC AG, Zug (CH)

(72) Inventors: Hubert Seiberle, Weil am Rhein (DE); David Pires, Giebenach (CH)

(73) Assignee: ROLIC AG, Zug (CH)

( * ) Notice: Subject to any disclaimer, the term of this patent is extended or adjusted under 35 U.S.C. 154(b) by 374 days.

(21) Appl. No.: 15/573,714

(22) PCT Filed: May 17, 2016

(86) PCT No.: PCT/EP2016/060969
§ 371 (c)(1),
(2) Date: Nov. 13, 2017

(87) PCT Pub. No.: WO2016/188791
PCT Pub. Date: Dec. 1, 2016

(65) Prior Publication Data
US 2018/0120491 A1 May 3, 2018

(30) Foreign Application Priority Data

May 22, 2015 (EP) .................................... 15168803
Jul. 15, 2015 (EP) .................................... 15176762

(51) Int. Cl.
*G02B 5/00* (2006.01)
*B42D 25/30* (2014.01)
(Continued)

(52) U.S. Cl.
CPC .......... *G02B 5/3083* (2013.01); *B42D 25/29* (2014.10); *B42D 25/364* (2014.10);
(Continued)

(58) Field of Classification Search
CPC ...... G02B 5/3083; G02B 5/32; G02B 5/3066; G02B 5/3016; G02B 5/003; B42D 25/391;
(Continued)

(56) References Cited

U.S. PATENT DOCUMENTS 5,974,150 A    10/1999   Kaish et al.
2003/0035191 A1 * 2/2003 Moia ...................... G06K 19/18
                                                              359/281
(Continued)

FOREIGN PATENT DOCUMENTS

JP    2010-269581 A    12/2010
JP    2013-47789 A     3/2013
(Continued)

OTHER PUBLICATIONS

International Search Report for PCT/EP2016/060969, dated Jul. 20, 2016.

*Primary Examiner* — Nelson S. Giddins
(74) *Attorney, Agent, or Firm* — Sughrue Mion, PLLC

(57) ABSTRACT

The invention relates to an optical security system comprising an optical element with a patterned anisotropic optical property, wherein information is encoded and encrypted in the pattern of the optical element. The system further comprises a patterned polarizer in which the pattern is such that the information stored in the optical element can be decrypted.

15 Claims, 21 Drawing Sheets

(51) Int. Cl.
*G02B 5/30* (2006.01)
*B42D 25/364* (2014.01)
*G02B 5/32* (2006.01)
*B42D 25/391* (2014.01)
*B42D 25/29* (2014.01)
*G06K 19/06* (2006.01)

(52) U.S. Cl.
CPC ........... *B42D 25/391* (2014.10); *G02B 5/003* (2013.01); *G02B 5/3016* (2013.01); *G02B 5/3066* (2013.01); *G02B 5/32* (2013.01); *G06K 19/06046* (2013.01)

(58) Field of Classification Search
CPC . B42D 25/364; B42D 25/29; G06K 19/06046
See application file for complete search history.

(56) References Cited

U.S. PATENT DOCUMENTS

| | | | | |
|---|---|---|---|---|
| 2006/0115082 | A1* | 6/2006 | Kevenaar | G07D 7/0047 380/216 |
| 2011/0017838 | A1* | 1/2011 | Delbaere | B42D 25/318 235/494 |
| 2013/0027767 | A1 | 1/2013 | Morishima | |
| 2018/0024497 | A1* | 1/2018 | Lieberman | G02B 5/32 359/22 |

FOREIGN PATENT DOCUMENTS

| | | | |
|---|---|---|---|
| WO | 98/52077 A1 | 11/1998 | |
| WO | 03/006261 A1 | 1/2003 | |
| WO | WO-03006261 A1 * | 1/2003 | ................ B44F 1/06 |
| WO | 2009/112206 A2 | 9/2009 | |
| WO | 2011/017749 A1 | 2/2011 | |

* cited by examiner a)

Fig. 10.1
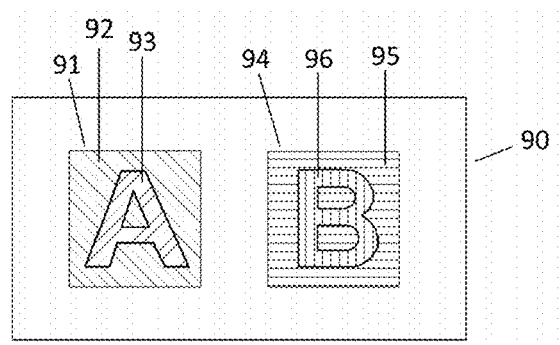
Fig. 10.2
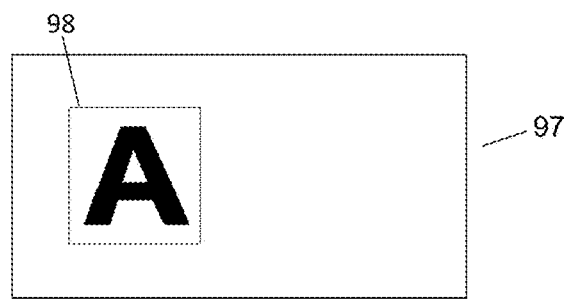
Fig. 10.3
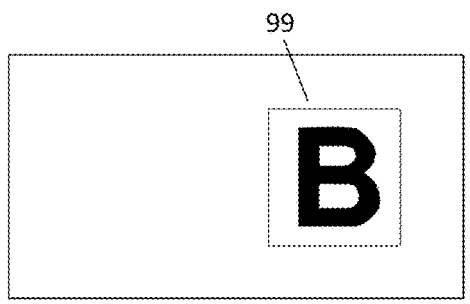
Fig. 10.4
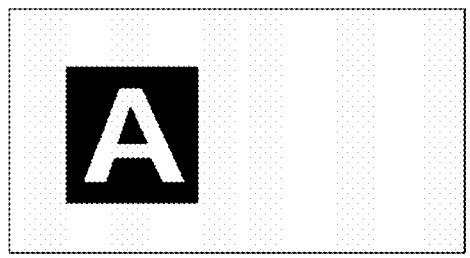
Fig. 10.5
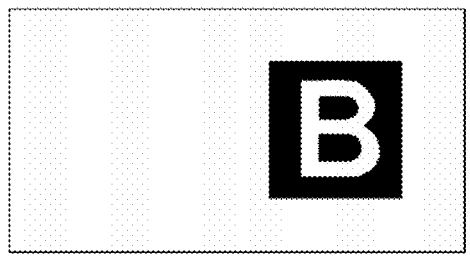

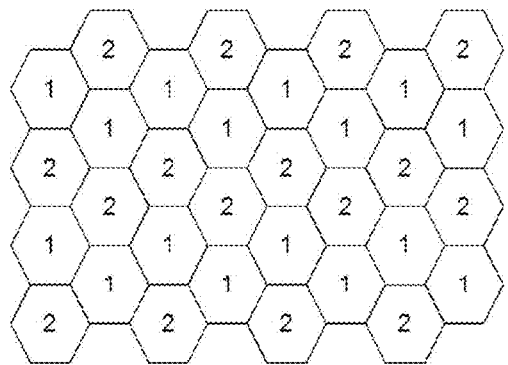
Fig. 11.1
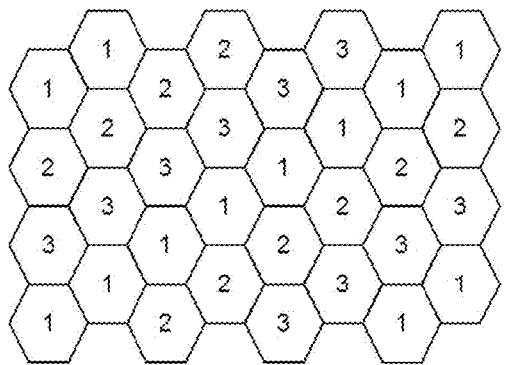
Fig. 11.2
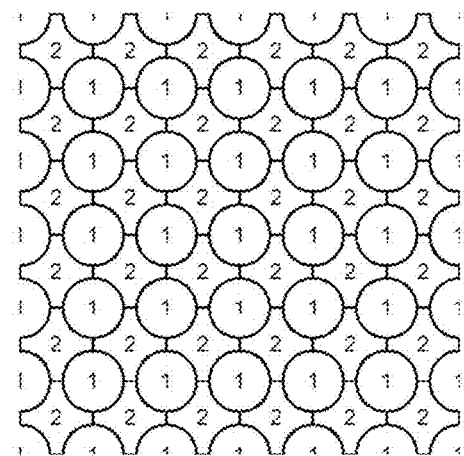
Fig. 11.3
Fig. 11.4
Fig. 11.5
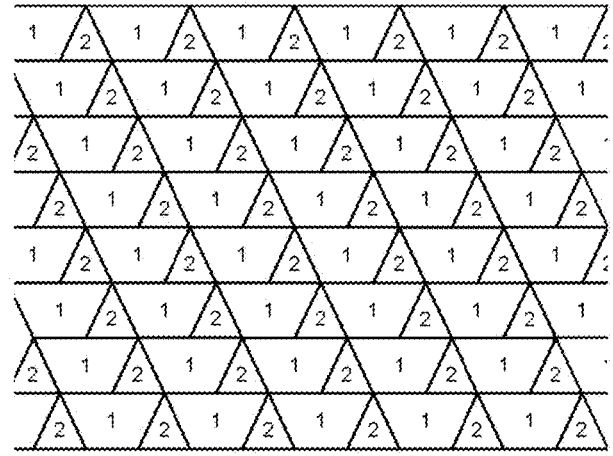
Fig. 11.6

Fig. 12.1
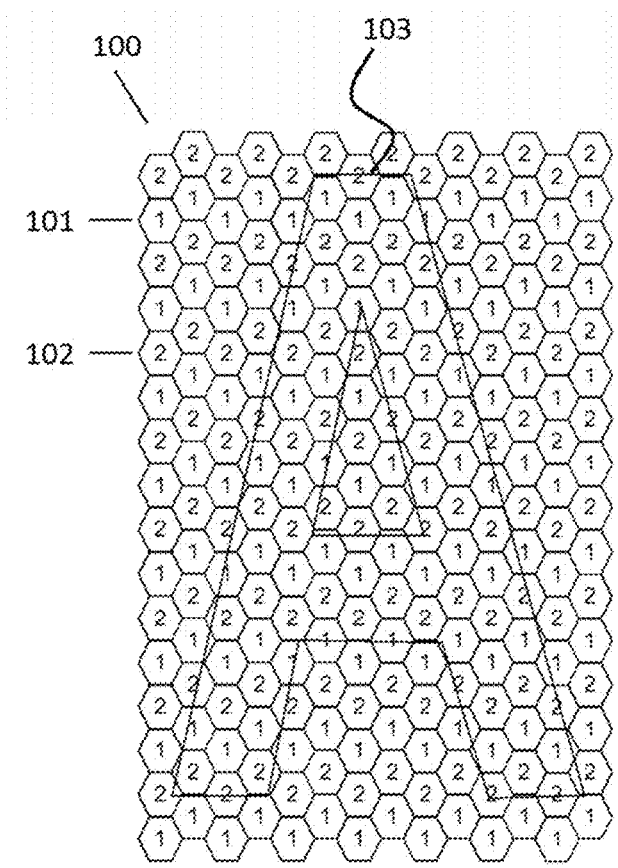
Fig. 12.2
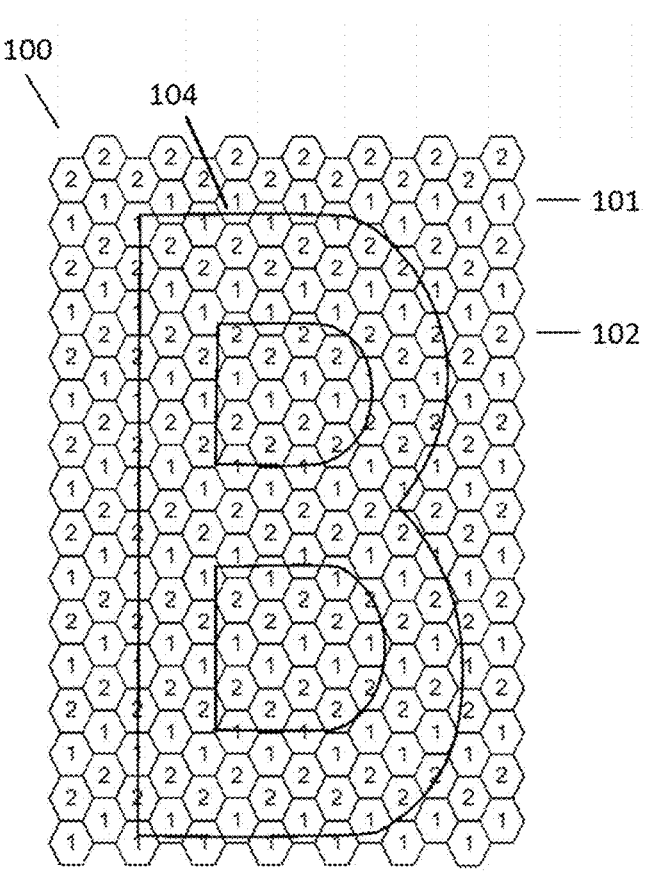

Fig. 12.3
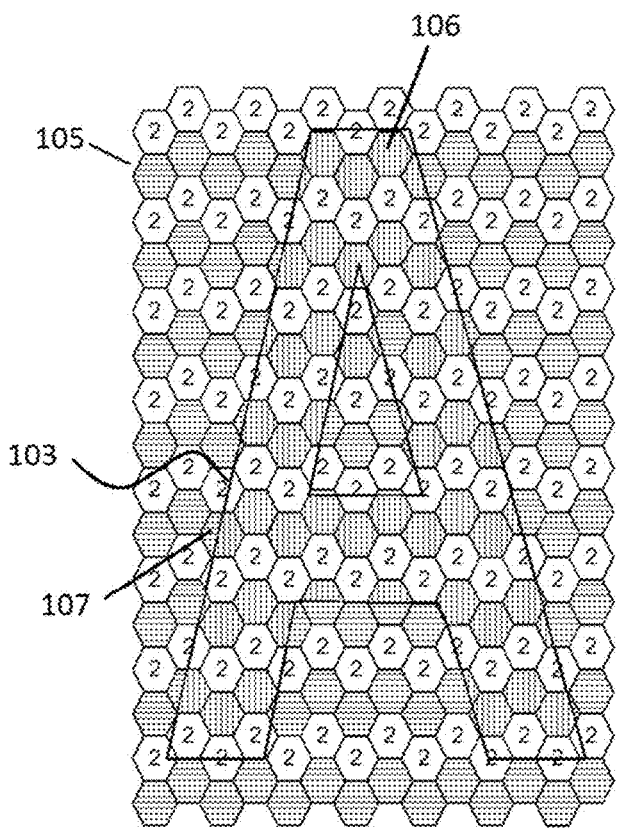
Fig. 12.4
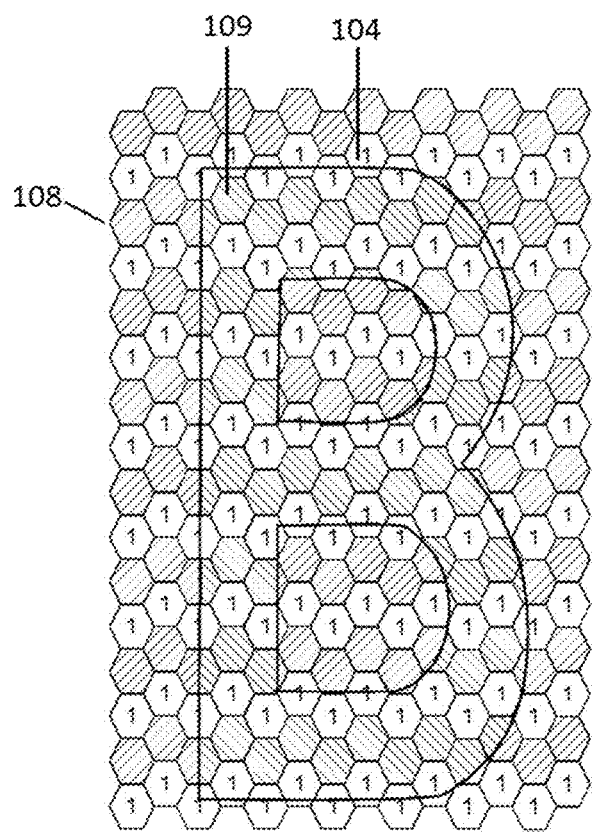

Fig. 12.5
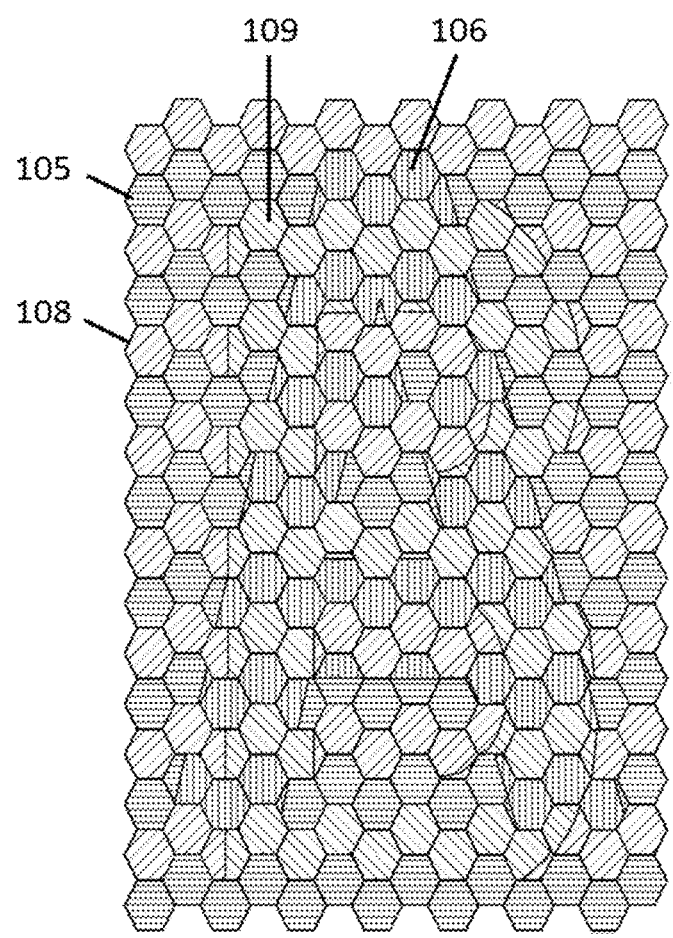

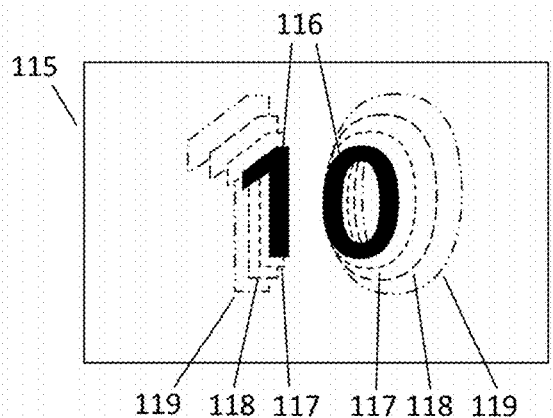
Fig. 13.1
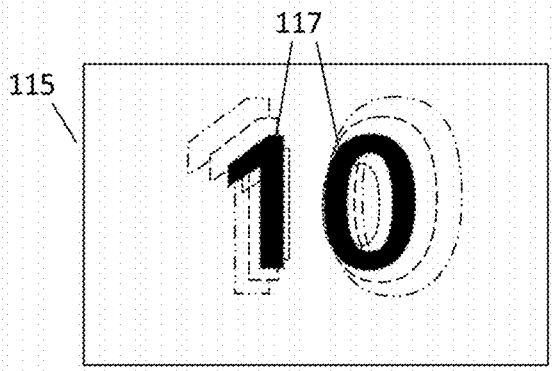
Fig. 13.2
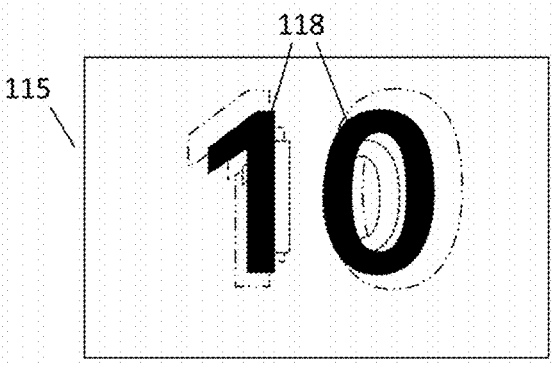
Fig. 13.3
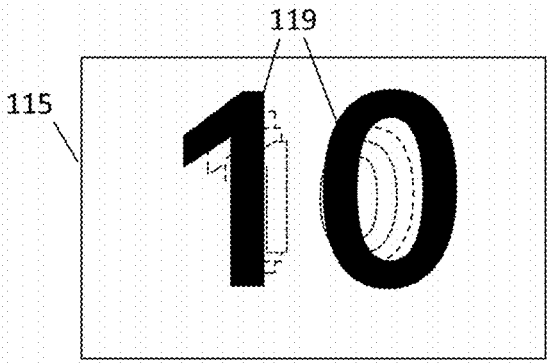
Fig. 13.4

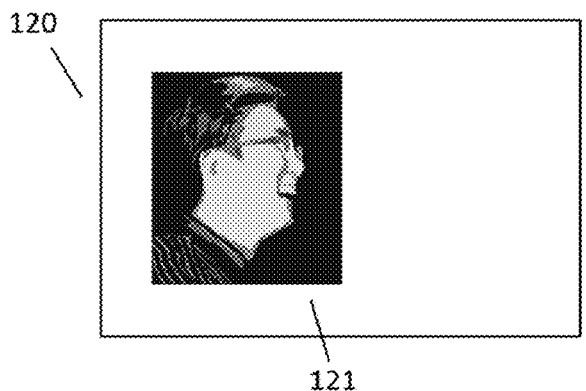
Fig. 14.1
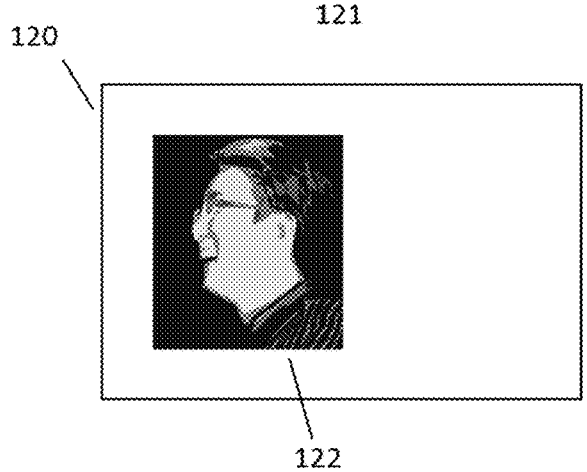
Fig. 14.2
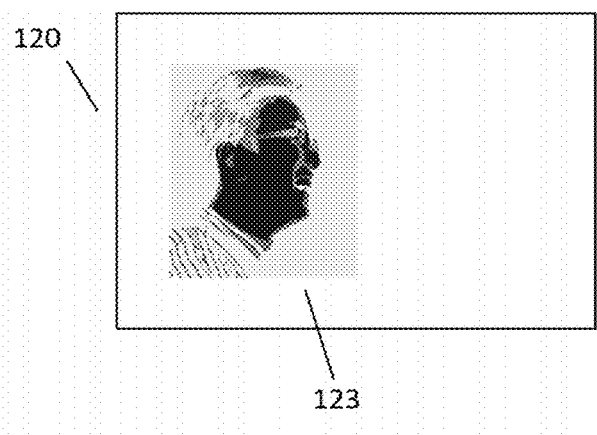
Fig. 14.3
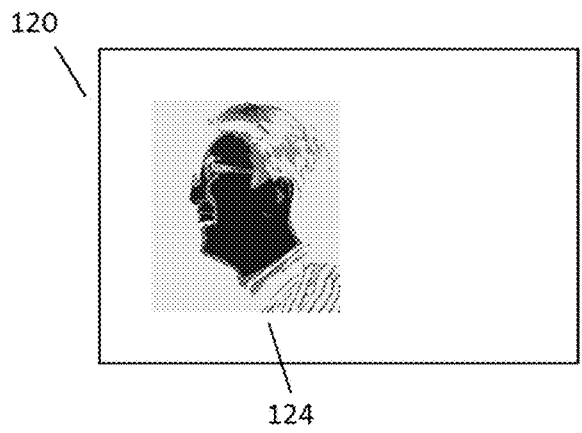
Fig. 14.4

ENCRYPTED OPTICAL SECURITY DEVICE

CROSS REFERENCE TO RELATED APPLICATIONS

This application is a National Stage of International Application No. PCT/EP2016/060969 filed May 17, 2016, claiming priority based on European Patent Application No. 15168803.3 filed May 22, 2015 and European Patent Application No. 15176762.1 filed Jul. 15, 2015, the contents of all of which are incorporated herein by reference in their entirety.

TECHNICAL FIELD

The invention relates to optical security devices comprising an optical element with anisotropic optical properties having information encoded and encrypted in an orientation pattern and a separate polarizer for decrypting and decoding the information.

BACKGROUND OF THE INVENTION

Optical elements with patterned anisotropic properties are, for example, known as optical elements, which include a layer comprising polymerized or cross-linked liquid crystals with locally different optical axes directions. Such layers are, for example, prepared by applying cross-linkable liquid crystal materials on top of an alignment layer exhibiting locally different alignment directions. The liquid crystal material adopts the local alignment direction of the underlying alignment layer and is then cross-linked to fix the orientation.

An alignment layer with locally different alignment directions can easily be prepared by the photo-alignment technique, where a layer of a material, which is sensitive to the polarization of light, is exposed to linearly polarized light. Patterned alignment is achieved by changing the polarization direction of the light for the exposure of different regions of the photo-alignment layer. Detailed methods are, for example, described in WO 2009/112206.

WO 98/52077 discloses high level optical security devices with patterned anisotropic layers, in which the information content is shared between an optical element and an analyzer. For example, a patterned optical retarder represents part of an image whereas the rest of the image is encoded in an orientation pattern within the polarizer. The full image becomes only visible if the polarizer is exactly positioned above or below the patterned retarder. For any translation and/or rotation of the polarizer out of the desired position the full information will no longer be visible. Because part of the full information content is stored in the polarizer, such an encoded polarizer can only be used to visualize the desired information. Such devices are therefore mainly used for very high level security applications, as each design or image requires a different polarizer for restoring the full information.

Although there are a high number of optical effects known for security applications, there is still a constant need for novel distinctive features in optical security elements for forgery protection.

SUMMARY OF THE INVENTION

An object of the present invention is, therefore, to provide an optical security device or system with unique features, which offer a high level of security. A further object is to provide methods for manufacturing such devices.

According to a first aspect of the invention, there is provided an optical security system comprising
an optical element with a patterned anisotropic optical property, wherein information is encoded and encrypted in the pattern of the optical element, and
a patterned polarizer which can be arranged in a first and in a second position on the same side of the optical element such that in both positions the information incorporated in the optical element can be decrypted and decoded.

The optical element and the polarizer may be positioned on the same substrate. Preferably, the substrate is a banknote.

The patterned polarizer may be a linear polarizer or a circular polarizer. A preferred circular polarizer according to the invention comprises a linear polarizer and a quarter wave retarder which has an orientation pattern. A preferred linear polarizer according to the invention comprises oriented dichroic dyes, preferably embedded in a liquid crystal material. The linear polarizer can also be obtained by a linear polarizer and a half wave retarder which has an orientation pattern.

The encryption of the information in the optical element is based on an encryption map, which is also applied to define the pattern in the polarizer. As the encryption map does not incorporate part of the information, the same patterned polarizer can be used to decrypt optical elements with different information.

In the context of this invention an encryption map shall mean a geometrical assignment of an encryption algorithm. The same encryption map is used to encrypt the orientation pattern in the optical element and to define the pattern in the polarizer.

An encryption algorithm shall mean the kind of transformation to be applied to the optical element and to the polarizer. The algorithm for the optical element and the corresponding polarizer may be different from each other. Preferably, the same algorithm is applied for the optical element and for the corresponding polarizer.

The term encryption scheme shall be used to refer to the description of the encryption, which includes the encryption map and the related encryption algorithm.

The terms encoding and decoding of information refer to the conversion of visible information into an orientation pattern of an optical element and vice versa. For example, an area in the optical element that shall appear dark on observation has a first anisotropy direction and an area that shall appear bright has a second anisotropy direction. For encoding grey levels, intermediate anisotropy directions may be adjusted. Encoding and decoding information in anisotropic optical elements uses methods and materials known in the art, such as layers of cross-linked or polymerized liquid crystal materials which have locally different orientation directions. Such optical elements can be observed using a standard, non-patterned linear or circular polarizer. Contrary to such elements, the pattern in the optical element used in the devices according to the invention are additionally encrypted which prevents revealing the original information with a non-patterned linear or circular polarizer.

The encryption scheme according to the invention is applied to the pattern, in the following called the original pattern, that would encode the information in a state of the art patterned anisotropic optical element from which the information could be revealed by observation with a non-patterned linear or circular polarizer. The original pattern may be applied during the production of the optical element, for example in an alignment layer and later altered according to the encryption scheme. However, it is preferred that the pattern generation in the optical element already starts from encrypted pattern. Encryption of the pattern can for example be done by a computer software by calculating an orientation pattern which results from applying the encryption scheme to the original pattern. In this case, the original pattern has never been applied to any part of the optical element but has only been used as a theoretical intermediate construction.

According to the invention, the encryption map used for encrypting the pattern in the optical element is also used to define the pattern in the polarizer. Therefore, the encryption map makes the link between the optical element and the related patterned polarizer.

State of the art patterning of an anisotropic optical material with the original pattern already constitutes a high level of security since the information encoded by the pattern is hidden and is only visible when observed with a polarizer. Encryption according to the invention adds an additional security level since restoring the information requires a polarizer comprising the encryption key.

The anisotropic optical property may refer to the optical absorption or to the birefringence. The property may be at any wavelength in the range covering UV-, visible and infrared light.

In case the anisotropic optical property is the optical absorption then the optical element acts as a linear polarizer and the pattern comprises areas with different polarization directions. A high degree of polarization is normally not required.

In case the anisotropic optical property is the birefringence, the pattern comprises areas with different orientation directions of the optical axes.

An optical security system according to the invention may comprise an optical element having both a pattern of the optical absorption as well as a pattern of the birefringence.

Information encoded and encrypted in an optical security system according to the invention can be visualized and recognized by a human observer. It is also possible that decoding and decryption of the information stored in the patterned anisotropic optical element is done by a machine, for example by positioning and/or moving the patterned polarizer relative to the patterned anisotropic optical element and recording or displaying the resulting optical information electronically. An electronic system may also compare the optical appearance of the decoded and decrypted information with a reference image for automatic verification of the authenticity.

BRIEF DESCRIPTION OF THE DRAWINGS

The invention is further illustrated by the accompanying drawing figures. The drawings are examples only and shall help to understand the invention but shall in no way limit the scope of the invention.

FIG. 5 shows examples of encryption maps with periodic modulation.

FIGS. 9a-9b show an example of an encryption map, which when applied to a non-patterned polarizer with the related encryption algorithm results in a patterned polarizer, wherein the polarization direction changes in different areas with different frequency along the vertical direction.

FIG. 10.1 shows a patterned retarder in a device according to the invention encoding for two images, which when observing with a displacement polarizer at different positions has the appearance as shown in FIGS. 10.2 to 10.5.

FIGS. 11.1 to 11.6 show different shapes and arrangements of image units.

FIGS. 12.1 to 12.5 illustrate the assignment of two images to a matrix of hexagonal image units.

FIGS. 13.1-13.4 show a patterned retarder of an optical security system according to the invention in which an image appears in different sizes upon shifting a displacement polarizer above the retarder.

FIGS. 14.1-14.4 show a patterned retarder of an optical security system according to the invention in which a first and a second image as well as the related negative images appear upon moving a displacement polarizer arranged above the retarder in one direction.

DETAILED DESCRIPTION OF THE INVENTION

The individual areas of an encryption map may have any shape, such as a polygon, preferably a regular polygon, and in particular may be quadratic, rectangular, trapezoid, triangular, hexagonal or have wave forms. But the form of the individual areas does not need to have any symmetry, such as the areas in the encryption map of FIG. 1b.

The shape of the pattern units of the original pattern and that of the encryption map need not be identical. The average area of pattern units in the encryption map may be smaller or larger than the average area of pattern units in the original pattern or they may be identical. The width and length of an individual area in the encryption map may be in the range from 1 µm to a few centimeters. The length shall mean the longest possible distance within an individual area in the encryption map. The width shall then mean the longest distance within the area in the direction perpendicular to the length direction. Preferably, the width of an area in the encryption map is between 10 µm and 5 cm, more preferred between 100 µm and 2 cm and most preferred between 0.5 mm and 5 mm.

Figure 1:
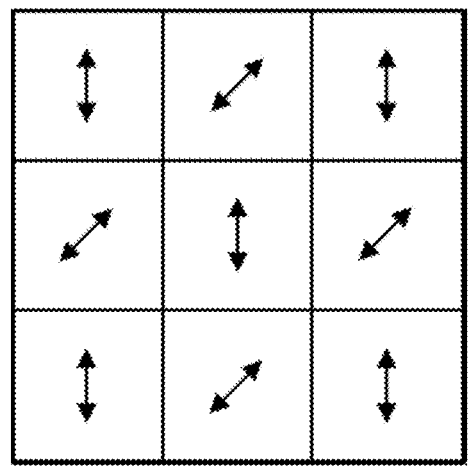
FIG. 1a depicts an exemplary orientation pattern which encodes for an optical information and which may further be encrypted according to a method of the invention.
FIG. 1b shows a general encryption map that could be applied to the pattern of FIG. 1a, following a related encryption algorithm.
Figure 1:
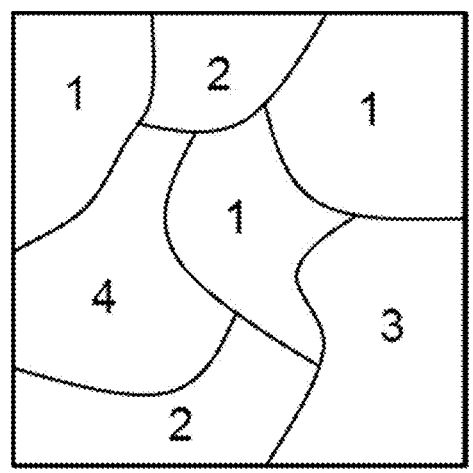

In the general example of FIGS. 1a and 1b, the pattern in FIG. 1a represents an exemplary original pattern, wherein the arrows indicate the alignment directions in different areas of the pattern and may refer, for example, to the optical axis directions of a patterned retarder layer or to the polarization direction in a patterned polarizer. FIG. 1b depicts an encryption map, wherein the numbers 1 to 4 refer to the encryption algorithm to be applied in the corresponding areas of the element to be encrypted. The encryption algorithm to be applied to the original pattern of the optical element and for defining the pattern in the polarizer may be different from each other. However, it is preferred that the same encryption algorithm is applied to the original pattern and for defining the pattern in the polarizer.

The encryption algorithm is an angle by which the alignment directions in the original pattern or in the polarizer have to be changed in the corresponding areas. As an example, the algorithms 1 to 4 in the areas of the map in FIG. 1b when thought to be projected on the original pattern in FIG. 1a may be defined as: for the areas in FIG. 1a which correspond to the areas 1 of FIG. 1b the alignment directions shall be rotated by 15°; in the areas corresponding to areas 2 the alignment directions shall be rotated by 30°; in the areas corresponding to areas 3 the alignment directions shall be rotated by 45° and in the areas corresponding to areas 4 the alignment directions shall be rotated by 60°. Similarly, the algorithm for the pattern definition in the polarizer may, for example, be: in the polarizer areas corresponding to the areas 1, 2, 3, 4, the alignment directions shall be 45°, 60°, 75° and 90°, respectively. As mentioned above, it is preferred that the same encryption algorithm is used for the original pattern and for the polarizer. In this case the algorithm for the pattern definition in the polarizer would be: in the polarizer areas corresponding to the areas 1, 2, 3, 4, the alignment directions shall be 15°, 30°, 45° and 60°, respectively. Instead of a certain angle, the encryption algorithm may also describe a continuous variation of an angle. For example, the algorithm within a rectangular stripe may be a continuous angular variation along the short direction of the stripe from 0° to 90°. Above angles are examples only. Any other angle is possible as well.

For a modulation map like in FIG. 1b, there is just one position for the patterned optical element and the patterned retarder to fit and to observe the information stored in the optical element. According to the invention, the patterned polarizer is such that decryption works for at least two positions of the patterned polarizer on the patterned optical element. This can, for example, be achieved even for complex encryption maps like that in FIG. 1b by applying the encryption map to the polarizer a second or even several times, so that the patterned polarizer matches with the encrypted pattern in the optical element at different positions. In a preferred embodiment of the invention, the patterned polarizer comprises a periodic modulation, which can, for example, be achieved by repeating the encryption map several times in a certain direction. The size of the modulated area on the patterned polarizer may be even larger than the encrypted pattern in the optical element. This allows, for example, to position the patterned polarizer on top of the patterned optical element and shift it along a certain direction until the pattern of the incorporated encryption map of both elements match with each other in order to decrypt the stored information.

Figure 5:
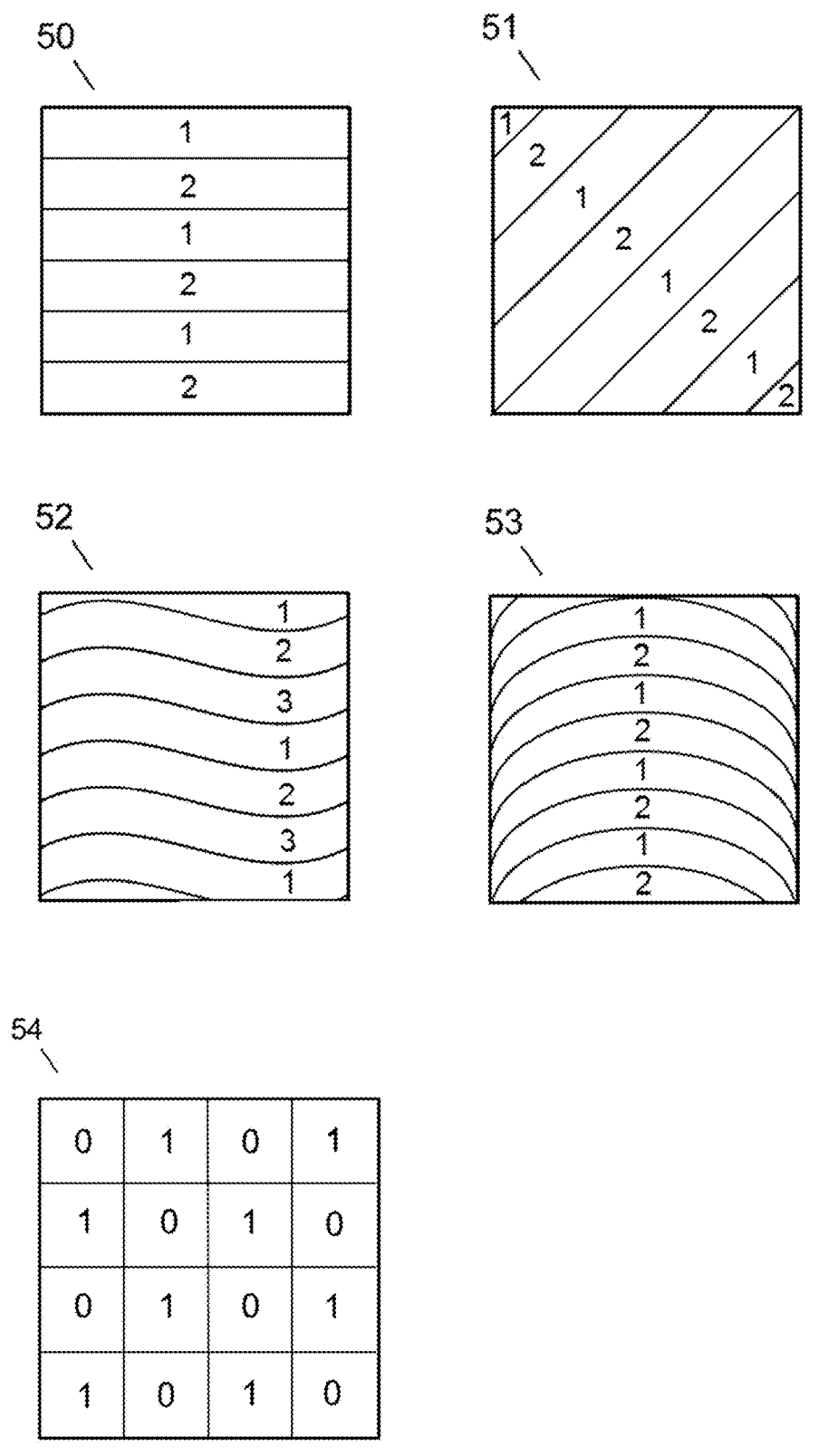

In a preferred embodiment of the invention, the encryption map itself comprises a periodic structure. FIG. 5 depicts a few examples to support the understanding of the principle, but there are many other periodic structures which could be applied. Encryption map 50 in FIG. 5 comprises stripes with two kinds of areas referring to encryption algorithms 1 and 2. Encryption map 51 has diagonal stripes also referring to two kinds of encryption algorithms. Encryption map 52 has areas in the form of periodic waves, which refer to three kinds of encryption algorithms. Obviously, it is possible to have a high number of areas each referring to a different encryption algorithm, even in a periodic arrangement. As another example, the areas in encryption map 53 are in the form of arcs. In preferred embodiments of the invention, the encryption map comprises periodic structures in two or more directions. For example, the encryption map 54 has periodic structures in horizontal and in vertical direction. The exemplary structures of FIG. 5 shall in no way limit the number and kind of periodic structures in an encryption map. Rather than that, any number of structures is possible.

An advantage of a periodic structure in the encryption map is that there are many positions along one or more directions for which the applied encryption map in the optical element and in the patterned polarizer can match such that the information encoded and encrypted in the optical element can be decrypted and decoded.

Preferably, the encryption scheme is such that the patterned polarizer when arranged above or below the optical element can be shifted from a first to a second position without rotation, such that the image stored in the pattern of the optical element is decrypted in the first position providing a first appearance and the encrypted image is decrypted in the second position providing a second appearance. The different appearance may refer to different contrast and/or color. Preferably, in the second position the image appears with inverse contrast compared to the image appearance for the first position.

In the simplest case, the encryption map has only two areas. For example, the upper half of an image may be encrypted according to a first encryption algorithm and the lower half of the image may be encrypted according to a second encryption algorithm. In this case it is advantageous, as mentioned above, to apply the encryption map to the polarizer a second or several times, otherwise only part of the image is decrypted and decoded if the polarizer is arranged in a second position on the patterned optical element.

Figure 2:
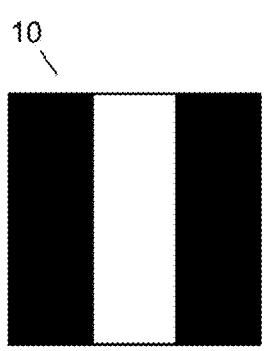
FIGS. 2a-2i explains encoding and encryption of a simple image using an encryption map and an encryption algorithm, wherein the optical element comprises a patterned retarder operated in reflection.
Figure 2:
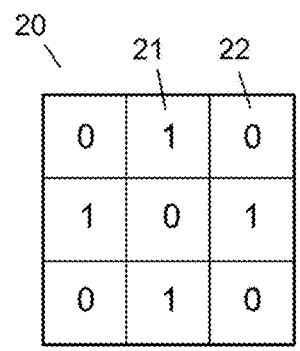
Figure 2:
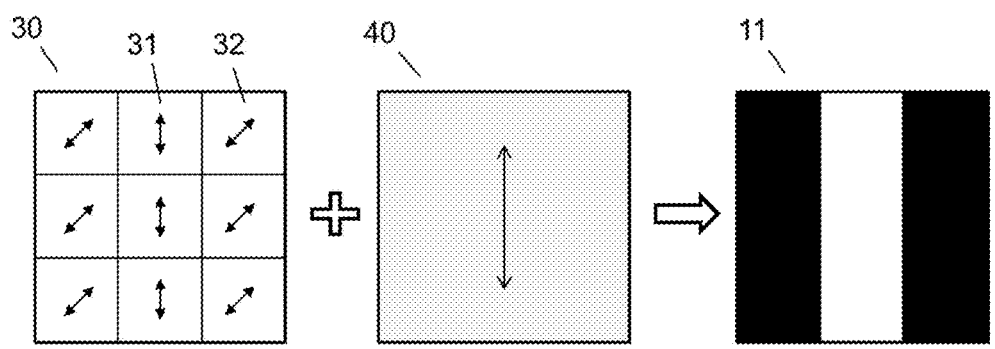
Figure 2:
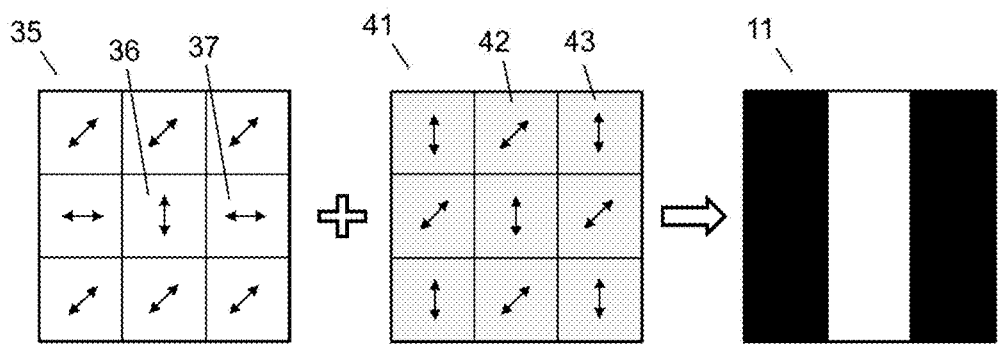
Figure 2:
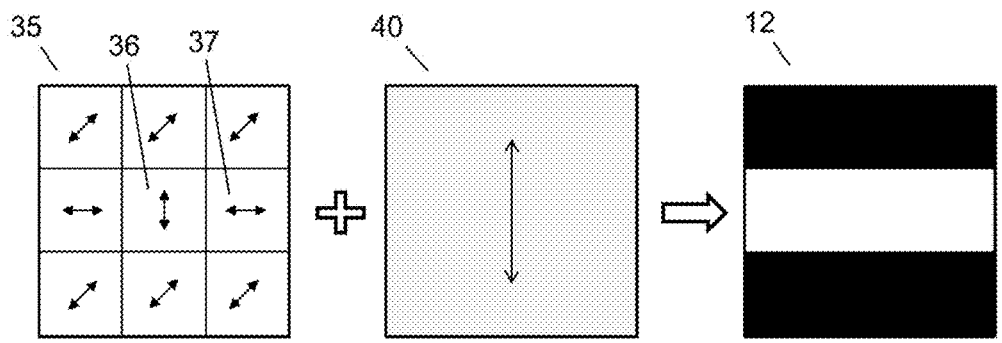
Figure 2:
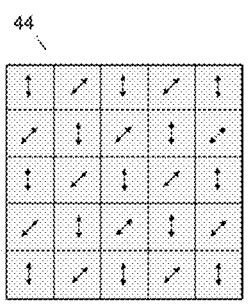
Figure 2:
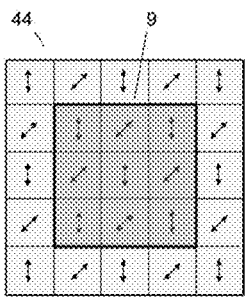
Figure 2:
Figure 2:
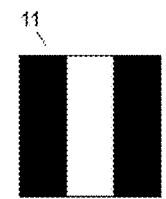
Figure 2:
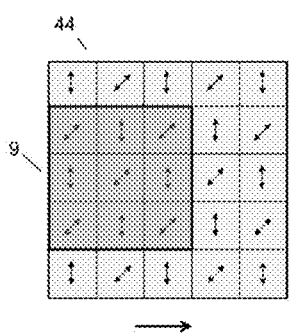
Figure 2:
Figure 2:
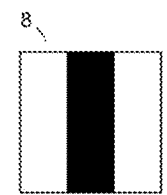
Figure 2:
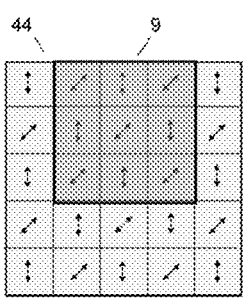
Figure 2:
Figure 2:
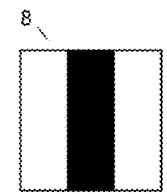
Figure 2:
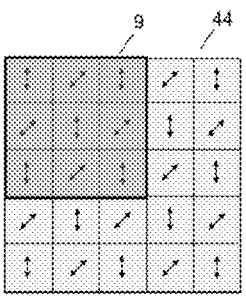
Figure 2:
Figure 2:
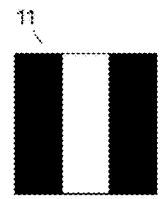

FIGS. 2a-2i illustrates a simple example of the principle of encoding/encryption and decoding/decryption. For the following explanation it is assumed that the optical element comprises a patterned retarder layer, preferably with a retardance corresponding to a quarter wave on top of a reflector. FIG. 2a depicts an image 10 which is desired to be stored as information in the form of a patterned retarder. The encryption map 20 in FIG. 2a corresponds to a cut-out of the encryption map 54 of FIG. 5, which has periodic structures in two directions. The numerals in the encryption map 20 refer to the encryption algorithm to be used for the optical element and for the polarizer. A retarder pattern that would reproduce the image 10 when observed through a non-patterned linear polarizer could, for example look like the pattern 30 in FIG. 2b and is therefore an original pattern. The white areas of image 10 are encoded by the alignment direction 31 and the black areas are encoded by the alignment direction 32. For a state of the art patterned quarter wave retarder comprising the original pattern on a reflector, the image 11 which is a reproduction of the image 10, would be observed when arranging a non-patterned linear polarizer 40 above the retarder such that the polarization direction is parallel to the directions 31. The optical principle is that light, incident from above and passing the polarizer 40 is linearly polarized parallel to the direction indicated in polarizer 40. Because the polarization direction of the light is parallel to the alignment direction 31, the polarized light is not affected in the corresponding areas of the retarder. The polarized light is then reflected at the reflector below the retarder and passes the retarder a second time, again without affecting the polarization state. Accordingly, the polarization state of the reflected light in those areas has not changed and can therefore pass the polarizer, which is the reason why these areas appear bright. On the other hand, in the retarder areas with the alignment directions 32 the polarization direction of the incident polarized light makes an angle of 45° with respect to the optical axis directions 32. Because of the reflection at the reflector below the quarter wave retarder, the light passes the retarder twice and accordingly the effective retardation is that of a half wave plate. The polarization direction of the reflected light when exiting the retarder at the polarizer side is therefore 90° with regard to the polarization direction of polarizer 40 and is therefore blocked. Accordingly, the areas with the alignment directions 32 appear dark. Of course, if either the patterned retarder 30 or the polarizer 40 were rotated by 45°, the function of the areas with alignment directions 31 and 32 would be exchanged and the image would be observed with inverse contrast.

In FIG. 2c the orientation pattern 35 is an encoded and encrypted representation of the image 10 and results from applying the encryption scheme, comprising the encryption map 20 and the related algorithm, to the pattern 30 of FIG. 2b. For the encryption algorithm it has been assumed that numeral 0 in the encryption map 20 means no change to the alignment direction and numeral 1 means a change of the orientation direction by 45°. Because of this algorithm, there are areas 37, in which the orientation direction is perpendicular to that of the area 36, which in the original pattern encoded for a bright state. However, the two orthogonal directions cannot be distinguished in polarized light and therefore the optical appearance is the same as if the orientation directions in areas 37 were parallel to that of areas 36. The same encryption scheme as for the optical element has been applied to the non-patterned polarizer 40, which results in a patterned polarizer 41, as shown in FIG. 2c. Because of the numerals 0 in areas 22 of the encryption map 20, the polarization directions 43 in the patterned polarizer 41 are the same as the polarization direction in polarizer 40, whereas the polarization directions in areas 42 are changed by 45° with respect to polarizer 40, according to the numeral 1 in areas 21 of the encryption map 20. Although the orientation pattern 35 is very different from the orientation pattern 30, the same image as in FIG. 2b is observed, if the patterned polarizer 41 is arranged above the retarder with the pattern 35.

However, the image 10 cannot be reproduced from the patterned retarder 35 using a polarizer with a wrong or without a pattern. If, for example, the patterned retarder 35 is observed with a non-patterned polarizer 40, an image 12 appears which is completely different from the image 10.

The type of the encryption map 20 and the more general encryption map 54 of FIG. 5 and the related encryption algorithm in the example of FIGS. 2a-2i applied to a line pattern is a preferred variant of the invention, as the resulting retarder pattern 35, when observed through a non-patterned polarizer 40, generates a line pattern which is rotated by 90° compared to the observation through the patterned polarizer 41. This offers an additional security feature, because when observed through the patterned polarizer 41 vertical lines appear, whereas horizontal lines appear when observed through a non-patterned polarizer, or vice versa. If, preferably, a polarizer is used as an analyzer that provides a patterned area and a non-patterned area, it is possible to observe horizontal lines for one position of the analyzer and vertical lines for another position of the analyzer.

The encryption scheme of the example of FIGS. 2a-2i are such that the patterned polarizer 41 can be arranged in a second and further positions to decrypt and decode the information stored in the patterned optical element 35. In addition, the patterned polarizer can be arranged in a first position on the patterned optical element such that the image stored in the pattern of the optical element is revealed with a first appearance and the patterned polarizer can be shifted to a second position without rotation such that decryption of the image provides a second appearance. The image in the second position appears with inverse contrast compared to the image revealed in the first position.

Because of the small number of pattern units both in the patterned optical element 35 and in the patterned polarizer 41, at least one third of the retarder pattern is not covered by the polarizer 41 anymore when shifting the latter into a second position. To avoid this, the pattern of the polarizer can be extended by applying the encryption map or at least a part of it a second time. Such a modified patterned polarizer 44 is shown in FIG. 2e. It differs from the patterned polarizer 41 by 2 additional rows and columns, both extending the checkerboard type pattern of the polarization directions. If the patterned polarizer 44 is centered above the patterned optical element 35 the image 11 is revealed again, as shown in FIG. 2f. The area 9 indicated within the patterned polarizer 44 refers to the position of the patterned optical element, however, the arrows within the area 9 still refer to the polarization directions of the patterned polarizer.

FIG. 2g illustrates the situation when the patterned polarizer is shifted to the right by one column of the pattern as indicated by the arrow below the polarizer.

Compared to FIG. 2f, in each area within the area 9 of the optical element the polarization directions of the patterned polarizer are changed by 45°. Hence, the image that is encrypted appears as a contrast inversed line pattern 8.

The same happens if, starting from the position of FIG. 2f, the polarizer is shifted down by one row, as indicated by the arrow right of the patterned polarizer of FIG. 2h. Accordingly, by shifting the patterned polarizer by one row up or down or by one column to the left or to the right, an image 8 appears which corresponds to a contrast inversed image 11. If the polarizer is shifted by two columns or rows, or if it is, for example, shifted one row down and one column to the right, as illustrated in FIG. 2i, then the image 11 with positive contrast appears again.

Apparently, by shifting the patterned polarizer, switching between positive and negative contrast image can be achieved. As mentioned above in connection with FIG. 2b, for an optical element with the original pattern 30 switching between positive and negative contrast image can be achieved by rotating the uniaxial polarizer 40 by 45°. Hence, with the above described encryption scheme it is possible to achieve the positive-negative switching effect without rotation of the polarizer.

A patterned polarizer as part of an optical security system according to the invention, having the property that by shifting the polarizer relative to the patterned optical element the appearance of the encoded image changes shall be called a "displacement polarizer" in the context of this application.

A security system using a displacement polarizer is particularly useful for applications in which it is not possible to rotate an analyzer above a patterned anisotropic element for observation of the negative image. In a preferred embodiment of the invention, an anisotropic patterned optical element and a patterned polarizer, which can be used as a displacement polarizer, are located at different positions on the same substrate, such as a banknote. It is then possible to fold the substrate in order to overlap the optical element and the polarizer and then to slightly shift the elements against each other in order to see the positive and the negative image of the stored information. In another preferred embodiment of the invention, an anisotropic patterned optical element and a patterned polarizer, which can be used as a displacement polarizer, are on consecutive pages of a booklet, such as a passport.

Figure 3:
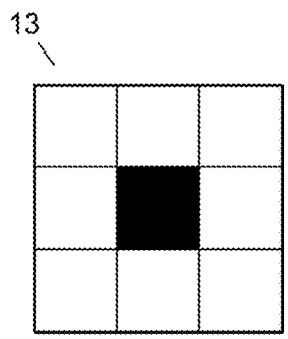
FIGS. 3a-3d explains encoding and encryption of another image using the same encryption map and encryption algorithm as in FIGS. 2a-2i, wherein the optical element comprises a patterned retarder operated in reflection.
Figure 3:
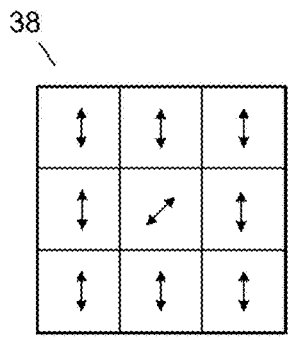
Figure 3:
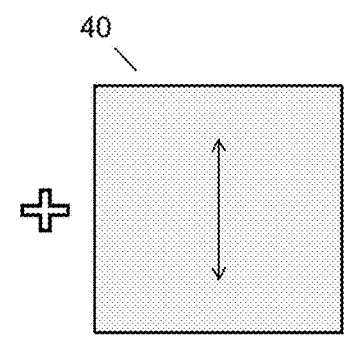
Figure 3:
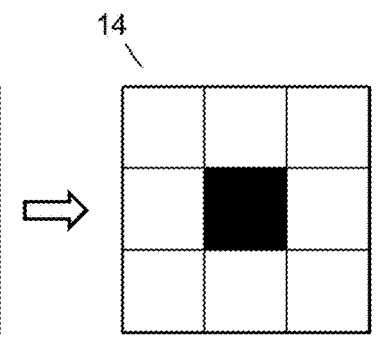
Figure 3:
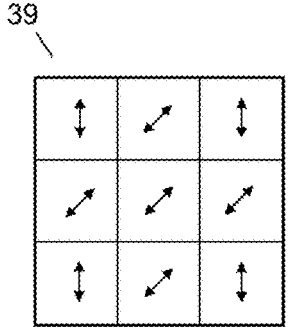
Figure 3:
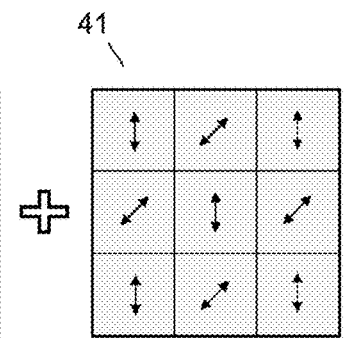
Figure 3:
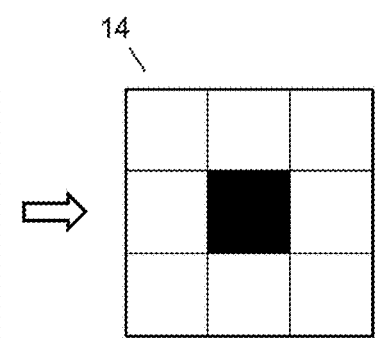
Figure 3:
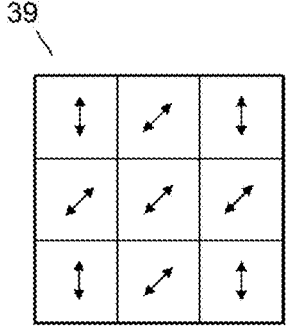
Figure 3:
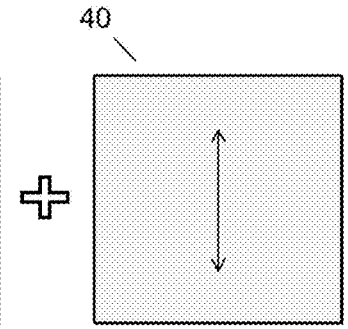
Figure 3:
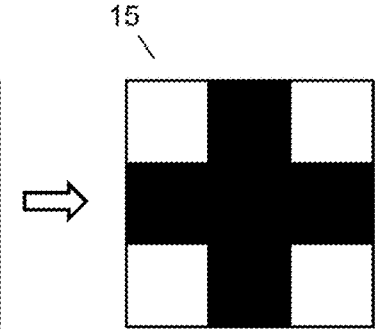

The example in FIGS. 3a-3d uses a different image 13, as shown in FIG. 3a, but the same encryption scheme, which includes encryption map 20 and the related encryption algorithm, as that in FIGS. 2a-2i. Hence, the patterned polarizer 41 is identical to that of the example in FIGS. 2a-2i. For the optical element the retardation may in principle have any value and the element may be operated in transmission or reflection, but for the following explanation it is again assumed that the optical element comprises a patterned quarter wave retarder plate on a reflector. FIG. 3b shows the original pattern 38 which, when the respective retarder is observed with a non-patterned polarizer 40 reveals the image 14, which is identical with the desired image 13. The encrypted patterned retarder 39 according to the invention, which is depicted in FIG. 3c, results from applying the encryption map and the related encryption algorithm as described for the example in FIGS. 2a-2i. When observed with the patterned polarizer 41 arranged at the correct position above the patterned retarder 39, the image 14 is observed, which again is identical with the desired image 13. If, as shown in FIG. 3d, the patterned retarder 39 is observed with a non-patterned polarizer 40, an image 15 is observed, which is totally different from the image 13 that has been encoded and encrypted in the retarder with the pattern 39. Hence, the security level is increased, as it is only possible to reveal the correct information from the patterned retarder 39 when the proper patterned polarizer is used for observation, contrary to the state of the art encoded pattern 38, which can be visualized with a standard, non-patterned polarizer.

As described above for the example in FIGS. 2a-2i, an extended polarizer 44 could be used for decrypting and decoding. By shifting the polarizer by one row or by one column, the appearance of the image changes by inversing its contrast. Hence, the patterned polarizer used in the example of FIGS. 3a-3d also a displacement polarizer.

Figure 4:
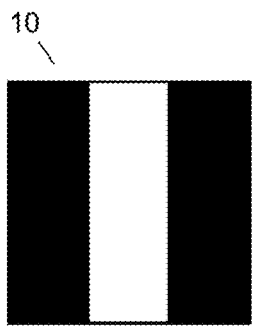
FIGS. 4a-4d explains encoding and encryption of the same image and the same encryption map as in FIGS. 2a-2i but another encryption algorithm, wherein the optical element comprises a patterned polarizer.
Figure 4:
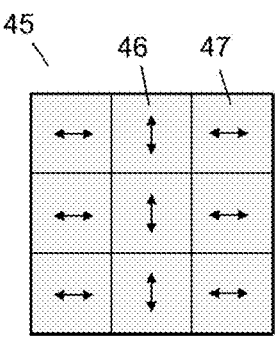
Figure 4:
Figure 4:
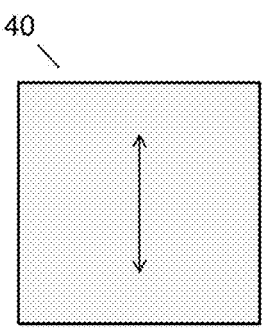
Figure 4:
Figure 4:
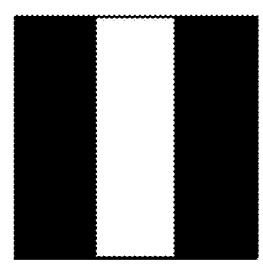
Figure 4:
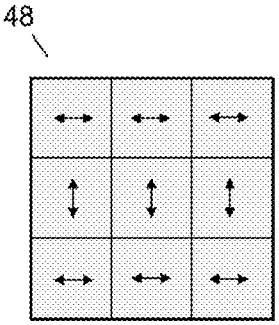
Figure 4:
Figure 4:
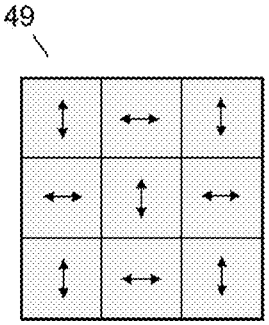
Figure 4:
Figure 4:
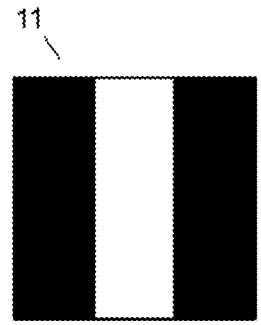
Figure 4:
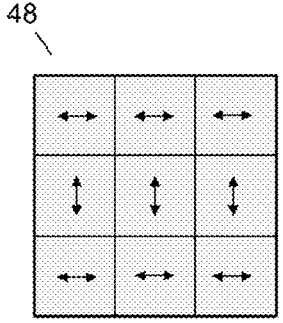
Figure 4:
Figure 4:
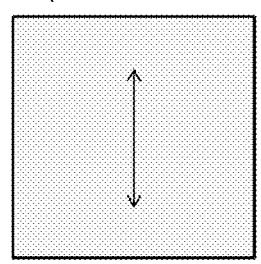
Figure 4:
Figure 4:
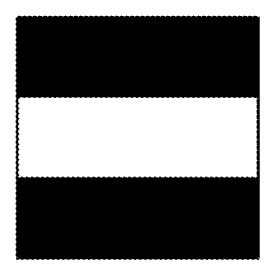

In the example of FIG. 4 the anisotropic optical property of the patterned optical element is the absorption, for example in the visible range of light. In this case, a security system according to the invention comprises an optical element with a patterned polarizer and a patterned polarizer as an analyzer. For the explanation below it is assumed that the element is operated in transmission, which means that the security system is observed from the opposite side of the light entrance. For observation of the hidden information the position of the analyzer seen from the observer may be behind the optical element or between the optical element and the observer. The optical element would of course also work in reflection if a reflector is behind the optical element as seen by an observer. As in the examples above, an image shall be encoded and encrypted in the anisotropic optical element in the form of an orientation pattern and a polarizer shall have a pattern in order to decrypt the information. Both the image 10 and the encryption map in FIG. 4a are the same as those in the example of FIG. 2a.

An original pattern in an anisotropically absorbing optical element, which when analyzed with a non-patterned linear polarizer 40 reproduces an image 11, which is identical to the image 10, has, for example a pattern 45 with polarization directions 46 and 47 which are oriented at 90° with respect to each other. The working principle of such a state of the art element differs from that of the patterned retarders of the examples in FIGS. 2a-2i and FIGS. 3a-3d. The white areas of image 10 are encoded by the alignment direction 46 and the black areas are encoded by the alignment direction 47. When arranging the non-patterned linear polarizer 40 in front or behind the patterned element 45 with the polarization direction parallel to the direction 46, the image 11 is observed, which is identical to image 10.

For the case that the non-patterned polarizer 40 is positioned between the observer and the patterned anisotropic layer and non-polarized light is incident from behind the patterned anisotropic layer, as seen by the observer, the light is linearly polarized on passing the patterned element 45 with locally different polarization directions 46 and 47. Because the polarization directions in the areas 46 of the element 45 are identical with the polarization direction of the non-patterned polarizer 40, the light passing areas 46 can also pass the polarizer 40 and therefore these areas appear bright. On the other hand, light passing the areas 47 of the element 45 is orthogonally polarized to the polarization direction of the polarizer 40 and is therefore blocked by the polarizer 40, which is why the areas 47 appear dark.

According to the invention an encryption scheme is applied to both the optical element and to the non-patterned polarizer 40. While the encryption map 20 in FIG. 4a is the same as in the examples of FIGS. 2a-2i and FIGS. 3a-3d, the encryption algorithm is different.

The encryption algorithm applied in this example is: maintain the orientation in those areas 22 indicated with the numeral 0 and rotate the orientation by 90° in those areas which are indicated by the numeral 1 in the encryption map 20. FIG. 4c shows the encrypted pattern 48 of the optical element and of the patterned polarizer 49, which results from the above operation. When arranging the polarizer 49 in front or behind the element with the pattern 48 the image 11 is again revealed. On the other hand, an image 12 appears in FIG. 4d when the encrypted pattern 48 is observed with the non-patterned polarizer 40. Similarly to the example with the patterned retarder in FIG. 2a-2i, the image 12 shows horizontal lines, contrary to the stored image 10 which has vertical lines. Hence it is not possible to reveal the correct information with the non-patterned polarizer.

Patterned polarizer 49 could be extended by additional rows and/or columns analogously to the patterned polarizer 44 in FIG. 2e. It would then also be possible to shift the patterned polarizer by one row or column to convert the observed image into an image with negative contrast. Hence, the patterned polarizer would also be a displacement polarizer.

Figure 6:
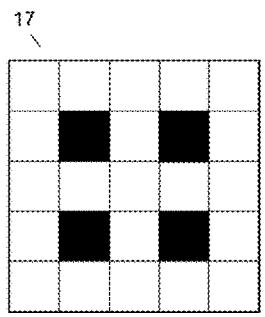
FIGS. 6a-6e show an example of a patterned retarder from which an image can be observed with positive and negative contrast by shifting a patterned polarizer arranged above or below the retarder in a certain direction.
Figure 6:
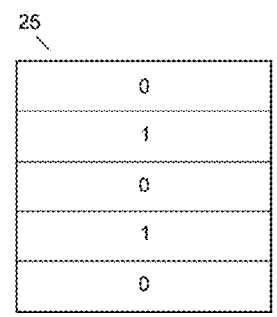
Figure 6:
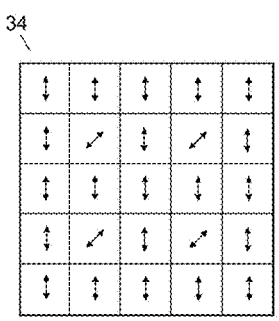
Figure 6:
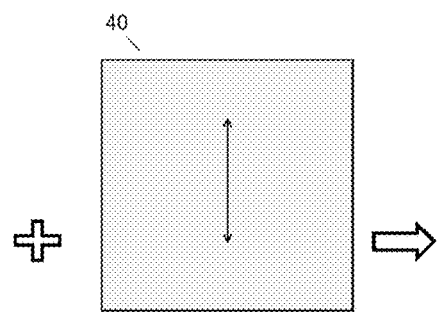
Figure 6:
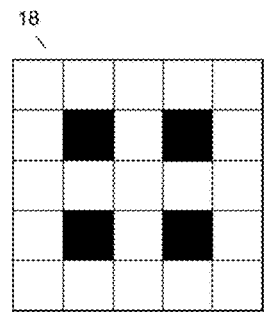
Figure 6:
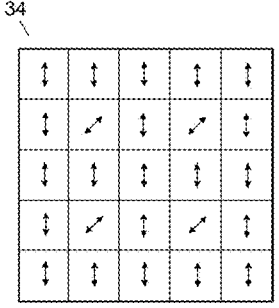
Figure 6:
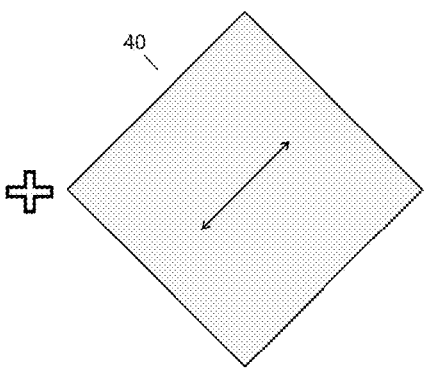
Figure 6:
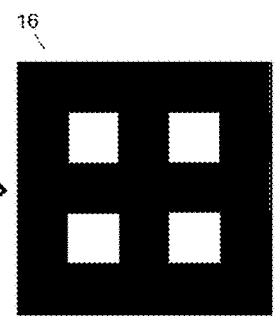
Figure 6:
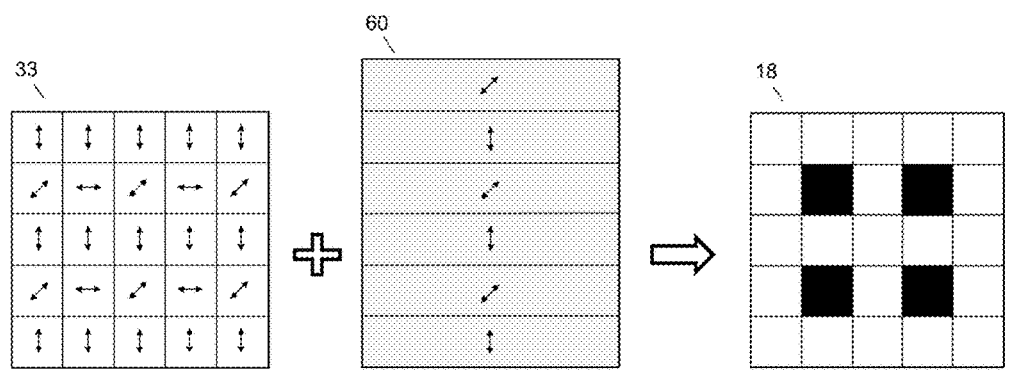
Figure 6:
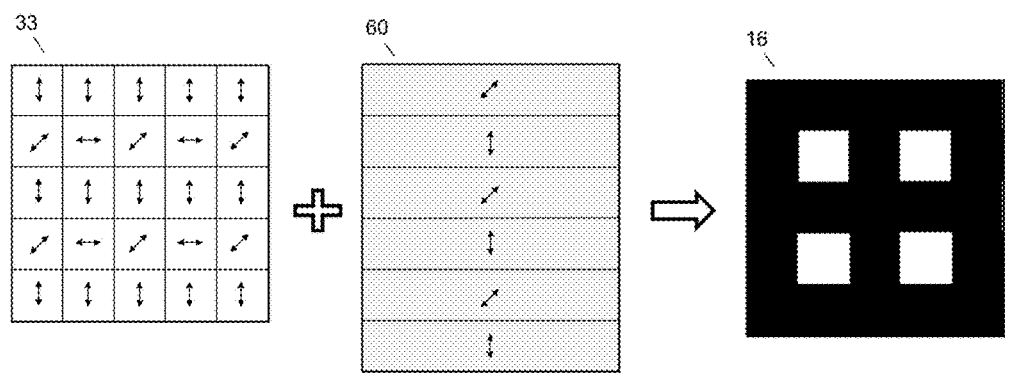

FIGS. 6a-6e show an example of an encryption scheme using a periodic encryption map. The image 17 in FIG. 6a shall be encoded and encrypted in an optical element comprising a patterned quarter wave retarder on top of a reflector. The reflector has the property that it maintains the polarization state of light upon reflection at least partially. The reflector may, for example comprise a metallic layer. The periodic encryption map 25 in FIG. 6a comprises repeating alternating stripes referring to encryption algorithms 0 and 1. FIG. 6b shows the original pattern 34 of a retarder which, when observed with a non-patterned polarizer 40 reveals the image 18, which is identical with the desired image 17. The orientation directions in the pattern are either 0° or 45°, but any other angles are possible, although it is preferred that the two different angles differ by about 45°. The state of the art retarder with the pattern 34 on a reflector can alternatively be observed with the non-patterned polarizer aligned in a different direction, for example at 45°, as shown in FIG. 6c. The information that is observed is still the same, but the brightness levels are inverted. Areas that appear dark in FIG. 6b appear bright in FIG. 6c and vice versa. Apparently, image 17 that was desired to be stored in the patterned retarder appears as a contrast inversed image 16 in FIG. 6c. This is a well-known security feature of retarders comprising orientation patterns, in addition to the feature that the stored images are hidden and become only visible when observed with a polarizer. Hence, to verify such an element, a linear polarizer is held above the optical element comprising the patterned retarder and is rotated by 45°. The stored image appears as a positive and as a negative image depending on the angle between polarizer and optical element. However, there are applications, where it is not possible to rotate the polarizer freely, for example, if the optical element and the polarizer are positioned on the same substrate, such as a banknote, or on consecutive pages of a booklet, such as a passport. By bending the substrate the polarizer can be brought in a position which overlaps with the optical element in order to observe the stored information. Depending on the size and location of the optical element and the polarizer, rotation of the polarizer by 45° may not be possible without destroying the substrate.

The pattern 33 in FIG. 6d according to the invention results from applying the encryption scheme including the encryption map 25. According to the applied encryption algorithm the orientation has not been changed in those stripes geometrically corresponding to stripes referring to numeral 0 in the encryption map, whereas the orientation has been rotated by 45° in those stripes corresponding to stripes referring to numeral 1 in the encryption map.

The same encryption scheme has been applied to the non-patterned polarizer 40, which results in a polarizer with a striped orientation pattern. For the following explanation, an additional stripe has been drawn at the top of the polarizer, which is still according to the invention. If the patterned polarizer 60 is arranged above the retarder with the pattern 33, such that the stripes drawn along the same horizontal lines in FIG. 6d overlap then the image 18 is again observed. If the patterned polarizer would then be shifted by two stripes up or down, the observed image would be the same, as long as there are enough stripes available in the polarizer to cover the pattern in the optical element.

On the other hand, if the patterned polarizer 60 is shifted up or down only by the width of one stripe, as depicted in FIG. 6e, the image 16 is observed, which is the same as would be observed for a retarder with an original pattern, when observed with a 45° rotated non-patterned polarizer, as explained above for FIG. 6c. Hence, a periodic encryption map according to the invention can be used to generate a security system comprising a patterned anisotropic optical element and a patterned polarizer, which can be shifted against each other in order to switch between the positive and the negative image of the stored information. This is particularly useful for applications in which it is not possible to rotate an analyzer above a patterned anisotropic element for observation of the negative image. Accordingly, a patterned polarizer for such a security system is also a displacement polarizer. In a preferred embodiment of the invention, an anisotropic patterned optical element and a patterned polarizer, both encrypted with a periodic encryption map, are located at different positions on the same substrate, such as a banknote. It is then possible to fold the substrate in order to overlap the optical element and the polarizer and then to slightly shift the elements against each other in order to see the positive and the negative image of the stored information. In another preferred embodiment of the invention, an anisotropic patterned optical element and a patterned polarizer, both encrypted with a periodic encryption map, are on consecutive pages of a booklet, such as a passport. In order to provide sufficient freedom for arranging the polarizer above the optical element, the total area of the pattern in the polarizer may be larger than the total patterned area in the optical element. For example, the patterned polarizer may have more stripes than the number of stripes in the encryption map which has been applied to the optical element. Apparently this can, for example, be achieved by applying the whole or part of the encryption map to the polarizer a second time.

Figure 7:
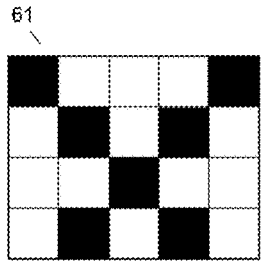
FIGS. 7a-7h show the different appearance of a patterned retarder, encrypted with a preferred scheme, by shifting the corresponding patterned polarizer arranged above or below the retarder in four different positions along a certain direction.
Figure 7:
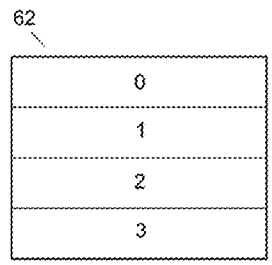
Figure 7:
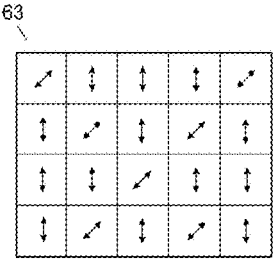
Figure 7:
Figure 7:
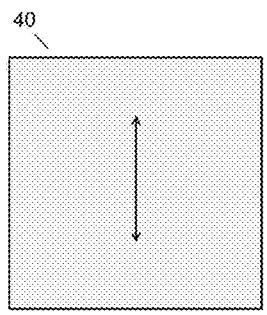
Figure 7:
Figure 7:
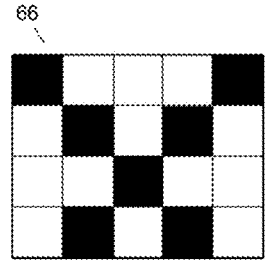
Figure 7:
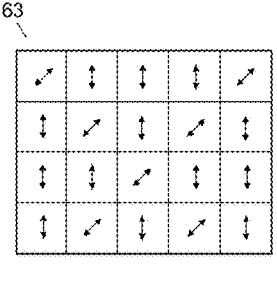
Figure 7:
Figure 7:
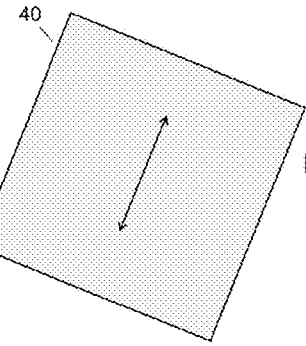
Figure 7:
Figure 7:
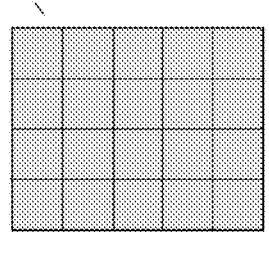
Figure 7:
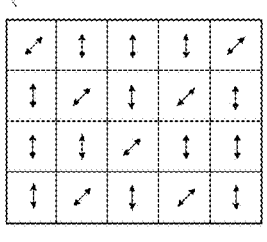
Figure 7:
Figure 7:
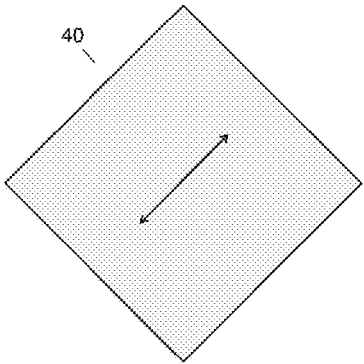
Figure 7:
Figure 7:
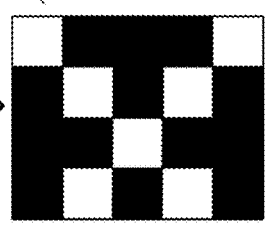
Figure 7:
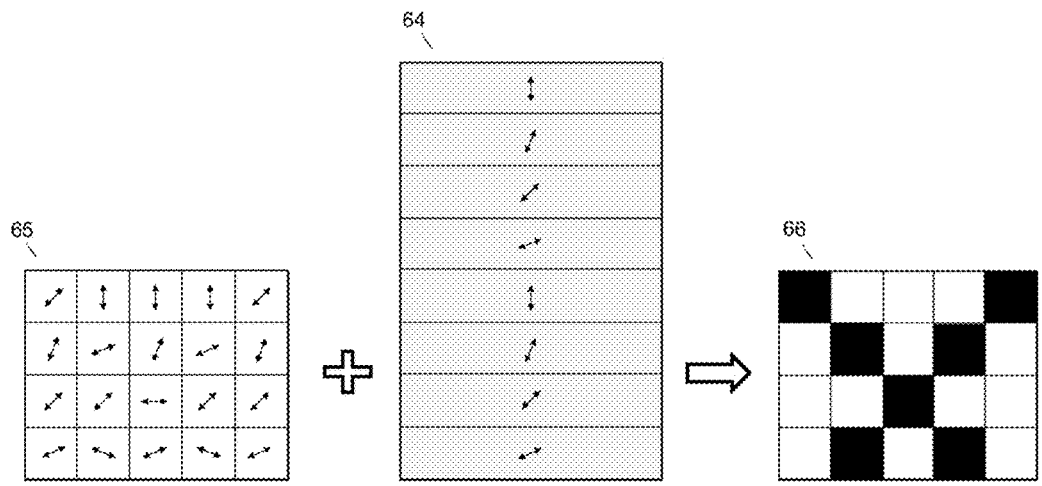
Figure 7:
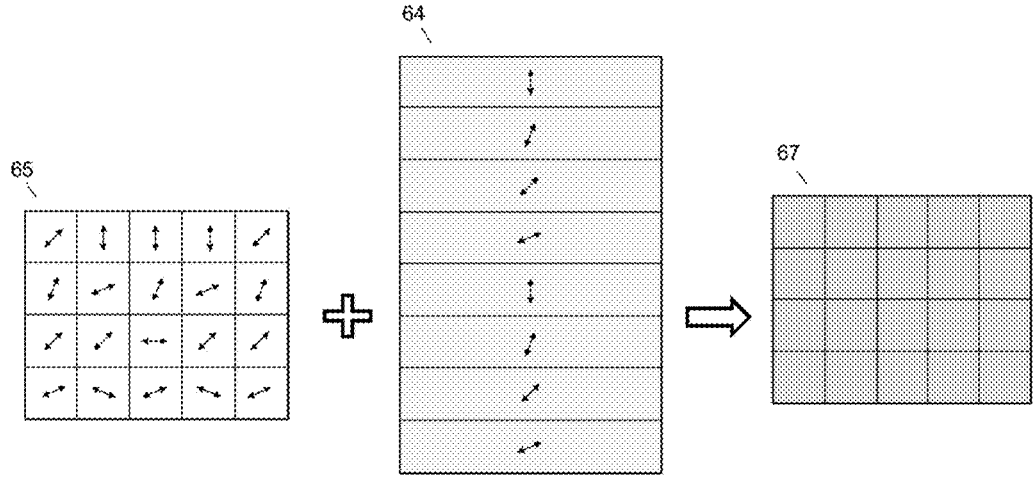
Figure 7:
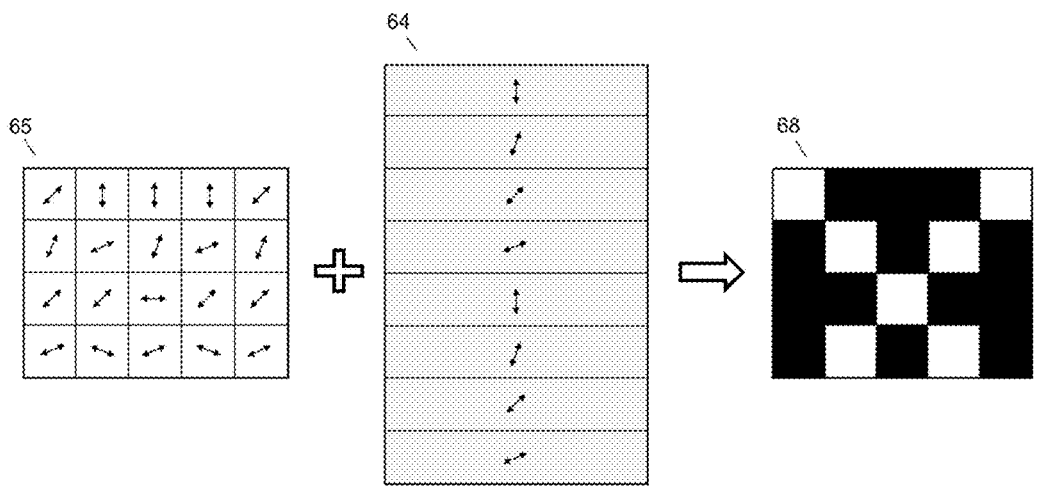
Figure 7:
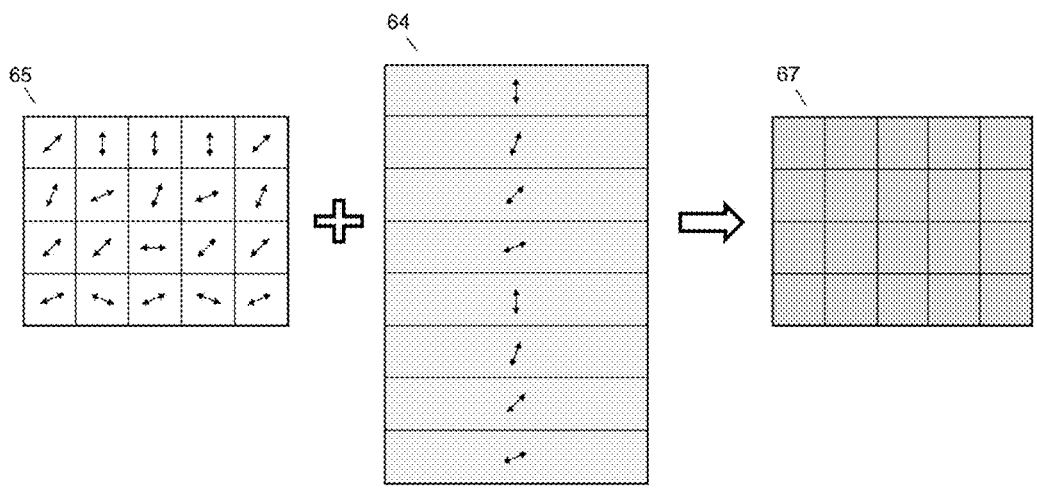

FIGS. 7a-7h are another example according to the invention, in which the individual areas of the encryption map 62 in FIG. 7a have the same shape, but four different areas referring to four different encryption algorithms. In the example the numbers 0 to 3 refer to the following encryption algorithms, which have been applied both to the patterned anisotropic optical element and the polarizer: 0 has been defined as no change, 1 means a rotation of 22.5°, 2 means a rotation of 45° and 3 means a rotation of 67.5°. Instead of stripes, the individual areas could have other shapes, as explained above. As a consequence of the same shape of the individual encryption map areas, the polarizer patterned according to the encryption scheme can be shifted to four different, well defined positions relative to the patterned anisotropic optical element encrypted according to the same scheme. As will be shown below, the appearance of an image for the four different positions are identical to the appearance of the same type of patterned anisotropic optical element, in which the same information is encoded but not encrypted, when analyzed with a non-patterned polarizer rotated into four different positions, namely 0°, 22.5°, 45° and 67.5°. A patterned polarizer as part of an optical security system according to the invention, having this property for analyzing a correspondingly encrypted anisotropic optical element is also a displacement polarizer.

The image 61 in FIG. 7a shall be used as an example for information to be encoded and encrypted in an anisotropic optical element, which shall comprise a patterned quarter wave retarder on top of a reflector. FIG. 7b shows the original pattern 63 of a retarder which, when observed with a non-patterned polarizer 40 with the polarization direction at 0° reveals the image 66, which is identical to the desired image 61. The orientation directions in the pattern are either 0° or 45°. As a reference direction for the angles the vertical axis in the drawings has been chosen.

If the polarizer is rotated by 22.5° (FIG. 7c) the polarization direction is at 22.5° to the optical axis directions of both kinds of areas of the patterned anisotropic optical element and therefore there is optically no difference between those areas. Hence the pattern is not visible for this polarization direction. A similar situation is for the polarization direction at 67.5° (not shown), for which the optical element appears as a grey area, but a pattern cannot be recognized. If the polarization direction is at 45° then the image appears with negative contrast (FIG. 7d), as in the example above described with regard to FIGS. 6a-6e.

The pattern 65 in FIG. 7e according to the invention results from applying the encryption scheme including the encryption map 62. The orientation has not been changed in the first row of the drawing, since the numeral 0 means no rotation. The orientation in the second, third and fourth row has been changed by 22.5°, 45° and 67.5°, respectively, according to the assumed encryption map and related algorithm. The pattern 65 looks rather complicated as it comprises areas with orientation directions 0°, 22.5°, 45°, 67.5°, 90° and 112.5°. However, for the purpose of observation with a polarizer, some of the orientation directions are equivalent to others, since a rotation of the orientation direction by 90° has no influence on the appearance, as long as observed from vertical to the plane of the element. Therefore, the pattern could be simplified by replacing the directions 90° by 0° and 112.5° by 22.5°, respectively. Hence the simplified pattern comprises only four directions, namely 0°, 22.5°, 45°and 67.5°.

The same encryption scheme has been applied to the non-patterned polarizer 40, which results in a polarizer 64 with a striped orientation pattern with four different polarization directions. Since a rotation of the polarization direction by 90° does not change the appearance of the optical element, the directions 0° and 90° in the pattern are equivalent. Therefore, the angular difference of the orientation from stripe to stripe is identical.

In order to cover the full area of the optical element when shifting the polarizer in different positions, the pattern in the polarizer has been applied twice. The angular difference of the orientation directions of neighboring stripes is still 22.5°. Preferably, the polarizer has a pattern with polarization directions which change along one direction stepwise, whereas the angular difference for each step is identical. The pattern could of course also be applied several times, which would make the pattern periodic. If the patterned polarizer 64 is arranged above the retarder with the pattern 65, such that the stripes drawn along the same horizontal lines in FIG. 7e overlap then the image 66 is observed, as for the pattern 63 observed with the non-patterned polarizer in FIG. 7b.

If the patterned polarizer 64 is shifted down by the width of one stripe, as depicted in FIG. 7f, the optical axis directions in each of the areas of the patterned anisotropic optical element make an angle of 22.5° or 67.5° with the polarization direction in the corresponding polarizer stripe. Accordingly, the situation is similar to that described with regard to FIG. 7c, and therefore the whole area of the optical element comprising the pattern 65 appears uniformly grey. The information is therefore not visible for this polarizer position.

If the patterned polarizer 64 is shifted down by an additional width of one stripe, as depicted in FIG. 7g, the image 68 is observed, which is the same as would be observed for a retarder with an original pattern, when observed with a 45° rotated non-patterned polarizer, as explained above for FIG. 7d.

If the patterned polarizer 64 is shifted down by a further width of one stripe, as depicted in FIG. 7h, the situation is similar to that in FIG. 7f and therefore the whole area of the optical element comprising the pattern 65 appears uniformly grey. The information is therefore also not visible for this polarizer position.

As mentioned above, the appearance of the information for the four different positions of the patterned polarizer 64 above the patterned anisotropic optical element with the pattern 65 corresponds to what is observed with a non-patterned polarizer held above the retarder with the non-encrypted pattern 63 with the polarization direction at 0°, 22.5°, 45° or 67.5°, respectively. According to the definition above, it is therefore a displacement polarizer. By further increasing the numbers of stripes and corresponding encryption algorithms of the map 62, the resulting displacement polarizer can accordingly be shifted into additional positions, each of them leading to an appearance which corresponds to that when original pattern 63 is observed with the non-patterned polarizer 40 at different rotation angles.

The number of different stripes in the encryption map may be very high, for example such that the angular differences between neighboring stripes of the correlated patterned polarization is only a few degrees. The lower the angular difference between neighboring stripes the smoother does the appearance change when shifting the displacement polarizer above the corresponding optical element.

In a preferred encryption scheme, the algorithm is such that when applied to the patterned anisotropic optical element and the polarizer, the orientation directions change continuously. If the angular variation per distance is constant, the corresponding patterned anisotropic optical element and the patterned polarizer have a similar function and appearance by shifting them relative to each other as when rotating a non-patterned polarizer above an anisotropic optical element with the non-encrypted original pattern. This allows achieving the same effects by shifting a polarizer according to the invention as for rotating a standard polarizer above a non-encrypted patterned anisotropic optical element. This is especially useful, if the optical element and the displacement polarizer are on the same substrate, such as a banknote, since in that situation rotation of a standard polarizer it is hardly possible.

In practice it may be easier to simulate a continuous change by a high number of areas with discrete orientation directions. Preferably, the encryption scheme is such that the polarization directions of neighboring areas of the resulting displacement polarizer differ by 5° or less, more preferred by 2° or less and most preferred by 1° or less. Preferably, the directional change of the pattern is identical from one stripe to the neighboring stripe. As mentioned above, the unit areas of the encryption map may have any other area than a stripe as long as it is possible that the displacement polarizer can be shifted with regard to the patterned anisotropic optical element such that the unit areas of both elements, which result from encryption, match with each other.

In a preferred embodiment of the invention, an optical security system comprises an optical element with a patterned anisotropic optical property and a patterned polarizer, which have been encrypted using an encryption scheme based on an encryption map, in which there are zones, which have the same dimension along a first axis and which refer to different encryption algorithms and are further arranged periodically along the first axis. The encryption algorithms related to the periodic zones preferably instruct a change of the orientation direction by an angle, which increments from zone to zone along the first axis by substantially the same angle. The periodically arranged zones of the encryption map may be separated from each other by areas referring to other encryption algorithms. In order to provide sufficient freedom for arranging the polarizer above the optical element, the total area of the pattern in the polarizer may be larger than the total patterned area in the optical element. For example, the patterned polarizer may have more stripes than the number of stripes in the encryption map which has been applied to the optical element. Apparently this can, for example, be achieved by applying the whole or part of the encryption map to the polarizer a second time. Because of the periodicity the patterned anisotropic optical element and the patterned polarizer can be shifted against each other along the first axis to different positions, which is similar to rotating a non-patterned polarizer above a patterned anisotropic optical element by different angles. The patterned polarizer is therefore a displacement polarizer according to the above definition. This is particularly useful for applications in which it is not possible to rotate an analyzer above a patterned anisotropic element for observation of the negative image. Preferably, the anisotropic patterned optical element and the displacement polarizer are located at different positions on the same substrate, such as a banknote. It is then possible to fold the substrate in order to overlap the patterned anisotropic optical element and the polarizer and then to slightly shift the elements against each other in order to see the stored information with different appearance. The anisotropic patterned optical element and the displacement polarizer may also be on consecutive pages of a booklet, such as a passport. It is then possible to shift the two pages against each other for observation of the different appearance, whereas rotation of the pages against each other would be hardly possible.

According to another example of the invention, motion impression can be created by moving a displacement polarizer relative to the correspondingly encrypted anisotropic optical element. As in the examples according to FIGS. 6a-6e and FIGS. 7a-7h, the same effect can be achieved by rotating a non-patterned polarizer during observation of the corresponding non-encrypted anisotropic optical element. For the following explanation it is assumed that the anisotropic optical element comprises a patterned quarter wave retarder on top of a reflector. The original pattern 71 of FIG. 8a, which has been chosen as an example, reveals an image 72 with a vertical black line in the middle of the optical element when observed with a standard polarizer 40. The black line appears because the polarization direction is 45° to the optical axis direction in the corresponding area of the orientation pattern of the optical element. If the polarizer were rotated by 22.5° to the left, the polarization direction would be 45° to the optical axis direction of the second and fourth column of the original pattern. Accordingly, the second and fourth columns would appear as black lines. If the polarizer were rotated by additional 22.5° to the left, the polarization direction would be 45° to the optical axis direction of the first and last column of the original pattern. Accordingly, the first and last columns would appear as black lines.

Figure 8:
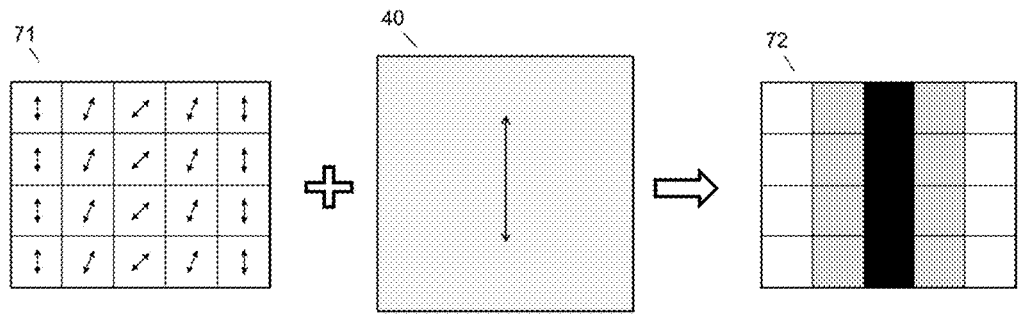
FIGS. 8a-8f demonstrates the creation of a moving impression by shifting a patterned polarizer above a patterned retarder, wherein both the retarder and the polarizer are encrypted using a preferred encryption scheme according to the invention and wherein the non-encrypted patterned retarder would have more than two orientation directions.
Figure 8:
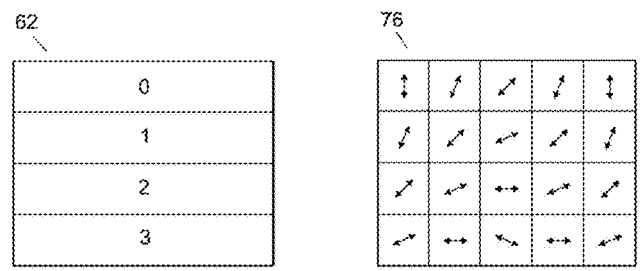
Figure 8:
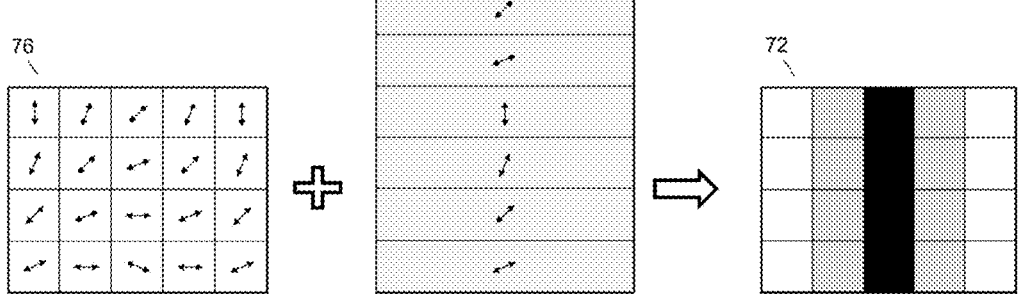
Figure 8:
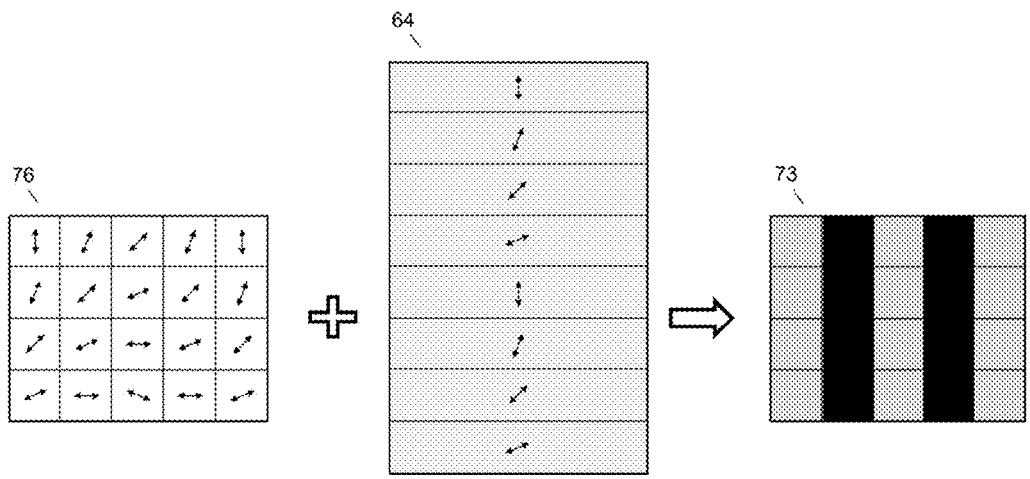
Figure 8:
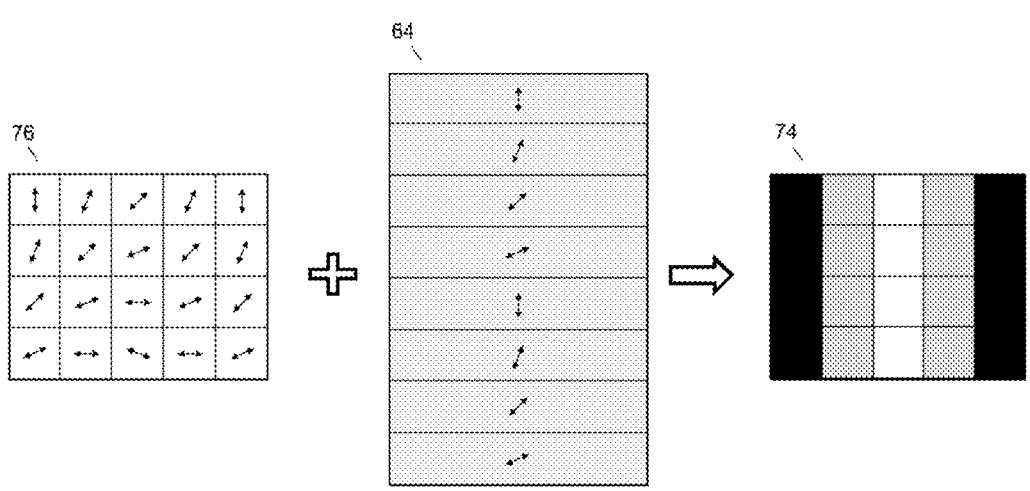
Figure 8:
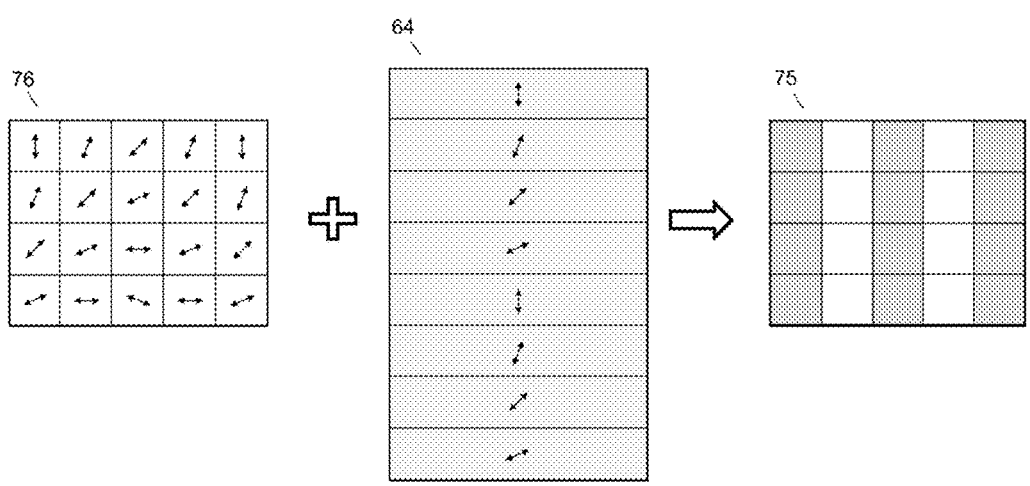

The encryption map 62 in FIG. 8b and the encryption algorithm are the same as in the example above. When applied to the pattern 71 the encrypted pattern 76 (FIG. 8b) results. The line pattern, which is obvious in the original pattern 71, can no longer be suspected from the encrypted pattern 76.

The patterned polarizer 64 which comprises the pattern resulting from applying the encryption scheme is the same as that described with regard to FIGS. 7a-7h. If the patterned polarizer 64 is arranged above the retarder with the pattern 76, such that the stripes drawn along the same horizontal lines in FIG. 8c overlap then the image 72 is observed, as for the optical element with the pattern 71 observed with the non-patterned polarizer 40 in FIG. 8a.

If the patterned polarizer 64 is shifted down by the width of one stripe, as depicted in FIG. 8d, the image 73 that is observed comprises two black lines in the second and fourth columns, whereas the first, the middle and the last columns appear grey.

If the patterned polarizer 64 is shifted down by another width of one stripe, as depicted in FIG. 8e, an image 74 is observed, which comprises two black lines in the first and last column, whereas the second and fourth columns appear grey and the third column appears bright.

If the patterned polarizer 64 is shifted down by another width of one stripe, as depicted in FIG. 8f, an image 75 is observed, which does not comprise black lines. Instead the first, the middle and the last columns appear grey and the second and fourth columns appear bright. By further shifting the polarizer by the width of one stripe, the image 72 would appear again. The sequence of images repeats by further moving the polarizer, provided that the pattern of the polarizer is repeated more than once, as otherwise the polarizer pattern would not cover the full area of the optical element anymore.

By moving the patterned polarizer stepwise down, the black line of image 73 seems to split into two black lines, one of them moving to the left and the other moving to the right. If the patterned polarizer were moved in the opposite direction, the black lines would correspondingly also move in opposite directions, which means they seem to move from the outside to the middle of the element. As described above, the number of different areas in the encryption map may be increased, in order to decrease the angular differences of the polarization direction of neighboring areas, which, in the extreme case, could even be a continuous change of orientation. This leads to an impression of a smooth movement of the lines. As mentioned above, the same movement impression can be achieved by observing an optical element comprising the original pattern with a standard polarizer, which is rotated to the left or to the right, respectively.

On the other hand, it is possible to achieve optical effects with the encrypted optical elements and polarizers, which cannot be achieved with a standard polarizer and a patterned anisotropic optical element. The above examples with regard to FIGS. 6a-6e, FIGS. 7a-7h and FIGS. 8a-8f were based on stripes as unit elements of the encryption map, which did not have a variation along the stripe direction. However, by introducing a variation of the encryption algorithm also along the stripe direction, novel optical effects can be generated, especially by moving the displacement polarizer relative to the encrypted optical element. In addition, it is possible to apply different encryption schemes to different areas of optical element and polarizer.

Figures 9A, 9B:
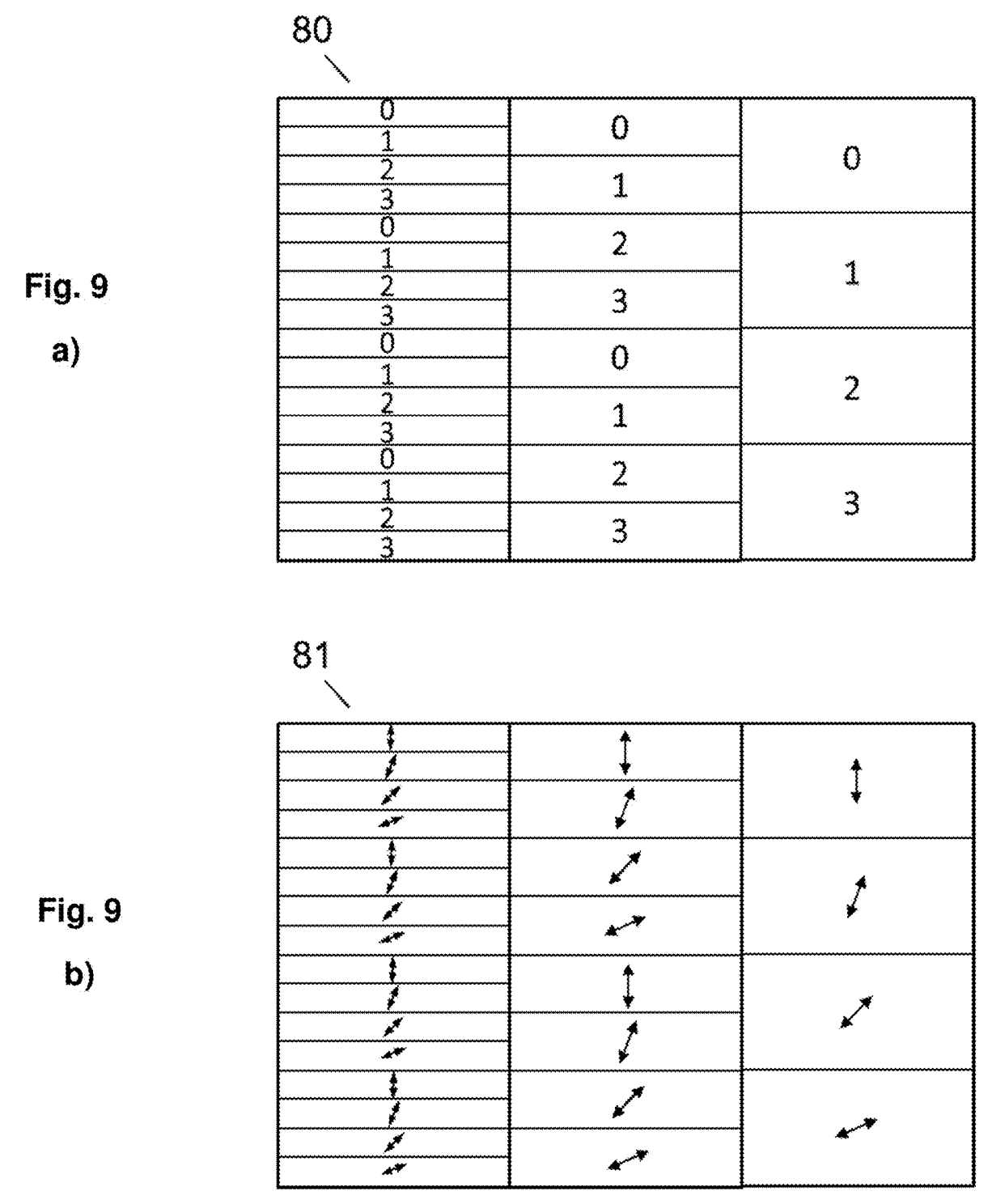

FIG. 9a depicts a simple example of an encryption map 80, which comprises 3 columns. Each column is subdivided into stripes with uniform dimension, but the dimension of the stripes along the vertical direction is different in the different columns. The numbers in the drawing refer to the same encryption algorithm as has been used with regard to the encryption map 62 in FIGS. 7a-7h, FIGS. 8a-8f and FIG. 9b show the patterned polarizer 81 made according to the above encryption scheme. Obviously the polarization direction along the vertical direction changes more often and therefore faster in the left than in the middle and right column. As the pattern changes periodically, the frequency in the left column is higher than in the middle column. If, for example, an original pattern is chosen for an anisotropic optical element that creates a moving impression when observed with a rotating non-patterned polarizer, as in the example of FIGS. 8a-8f, then an element with the corresponding encrypted pattern using above encryption scheme and observed with the above patterned polarizer will also create a moving impression by shifting the element and the polarizer against each other. The speed of movement will, however, be different within the 3 columns corresponding to the encryption map 80. The effect is of course more pronounced and smoother the higher the number of steps within a period.

In a preferred embodiment of the invention, there is one or more encryption schemes applied to an anisotropic optical element comprising encoded information and to a polarizer, such that there are two or more areas, in which the orientation direction changes monotonically and periodically but with different frequencies. The number of steps with orientation changes within one period in at least one of these areas is preferably higher than 3, more preferred higher than 7 and most preferred higher than 15. Preferably, the orientation direction changes continuously in at least one of above areas.

On the other hand, in case of observation of an anisotropic optical element with a rotating, non-patterned polarizer the speed of the angular change of the polarization direction is the same for any area observed in the optical element and hence it is not possible to achieve the impression of different movement speeds, as described for the system according to the invention.

The patterned polarizer 81 may be considered as being the result of applying the single encryption map 80, as described above, or it may be considered, for example, as the result of applying three encryption maps, each of them comprising one of the columns of map 80. A patterned anisotropic optical element and the corresponding patterned polarizer may have been encrypted by using different encryption schemes at different positions. For example, the three columns of map 80 may be separate maps applied at different positions of the optical element and of the polarizer.

In the following examples of optical security systems according to the invention an encryption scheme is used, for which the resulting patterned polarizer is a displacement polarizer. The difference between the examples is the original pattern, which encodes for certain information. The examples shall demonstrate the versatile optical effects that can be achieved by analyzing the corresponding encrypted optical element with a displacement polarizer.

For the description of the optical effect achievable with the optical security system of the examples, it is assumed that the patterned anisotropic optical element is a quarter wave retarder on top of a reflector. Also for the description of a non-encrypted anisotropic optical element having the original pattern, it is assumed that the patterned anisotropic optical element is a quarter wave retarder on top of a reflector. Of course, the anisotropic optical element could also be retarder with any retardance and it may be on a reflector or not. Without a reflector the optical element could work in transmission. The anisotropic optical element may also be a patterned polarizer.

According to a first of these examples the original pattern encodes for multiple information, such that for an anisotropic optical element comprising the pattern, the different information become optimally visible when observing the optical element with a non-patterned polarizer oriented in different directions.

In the following the term "image" shall stand for any kind of optical information, for example photographs, text including microtext, numbers, pictures, bar codes, symbols, characters, illustrations and graphics. Preferably, the image represents a photo, preferably a photo of a face, text, numbers or graphics.

An example with two different images is shown in FIGS. 10.1 to 10.5. FIG. 10.1 shows an example of an original pattern 90, which encodes for a first and for a second image. The first image is the character "A" represented by a pattern 91 comprising an area 93 with a first orientation direction and a background area 92 with a second orientation direction. The orientation directions in areas 92 and 93, for example, make an angle of 45° with each other. For example, the orientation direction in area 93 is at 0° and the orientation direction in area 92 is at 45° with regard to a reference direction, which may be the vertical direction. The second image 94 is the character "B" represented by a pattern 94 comprising an area 96 and a background area 95. The orientation directions in areas 95 and 96 differ, for example, by an angle of 45°. For example, the orientation direction in area 95 is at 22.5° and the orientation direction in area 96 is at 67.5° with regard to the above reference direction. The orientation directions in the pattern 91 related to the first image are rotated with regard to that of pattern 94 related to the second image by 22.5°. The angles assumed above are examples only, and are preferred as long as only two images are to be encoded, but many other angles work as well.

If a retarder having the original pattern would be observed by rotating a standard non-patterned polarizer arranged above the optical element, then the encoded images would subsequently appear at different angles of the polarizer, as shown in FIGS. 10.2 to 10.5. FIG. 10.2 shows the appearance 97 of the device when a non-patterned polarizer is held above the optical element with the polarization direction oriented at a first direction, for which the first image 98 is optimally visible. The observer sees a dark character "A" on a bright background, which is in this case considered as a positive contrast. By rotating the polarizer, the second image 99 becomes optimally visible at a second orientation direction of the polarizer, as shown in FIG. 10.3. The observer sees a dark character "B" on a bright background; hence it appears with a positive contrast. By further rotating the polarizer the first image becomes optimally visible again, but with a negative contrast. The observer sees a bright character "A" on a dark background, as depicted in FIG. 10.4. Analogously, if the polarizer is further rotated, the second image appears again, but with negative contrast, as is shown in FIG. 10.5.

The term "optimally visible" shall mean that the image appears with maximum contrast. Preferably, the pattern in the retarder is such that when a first image is optimally visible the second image is not or hardly visible and that when the second image is optimally visible the first image is not or hardly visible.

If according to the invention, an encryption scheme is applied to the above original pattern and a non-patterned polarizer, the encryption scheme being designed such that the resulting patterned polarizer can be used as a displacement polarizer with at least four positions, then the above appearance of the first and second image with positive and negative contrast as shown in FIGS. 10.2 to 10.5 are revealed by arranging and shifting the displacement polarizer above the retarder comprising the encrypted pattern. Hence two different images, both with positive and with negative contrast, can be revealed by shifting the displacement polarizer along one direction.

The information content of an image may be split up in image units. Image units assigned to the first, second or additional image(s) can then be distributed such that they share a certain area. In this way it is possible to place the different images substantially at the same position, such that they partially or fully overlap. The image units may have any shape, such as a polygon, preferably a regular polygon, or a circle. Preferred shapes are quadratic, rectangular, trapezoid, triangular, hexagonal and circular. FIG. 11.1 shows an area split up in hexagons, which are assigned either to the information content of a first or of a second image. An exemplary assignment is indicated by the numbers 1 and 2 inside the hexagons, wherein the numeral 1 refers to the first image and the numeral 2 refers to the second image. FIG. 11.2 shows an example of an area split up in hexagons, wherein hexagon image units are shared between the information content of three images. An exemplary assignment is indicated by the numbers 1, 2 and 3 inside the hexagons. FIG. 11.3 shows an example of squares, assigned to the information content of the first and the second image, respectively. In FIG. 11.4 alternating stripes are assigned to a first and a second image, respectively. The image units corresponding to the information content of the different images can be arranged in different ways, for example in alternating lines, such as in FIG. 11.4, or arranged in rows and/or columns, such as in FIG. 11.3, or in more complex distributions.

The image units related to the information content of the different images may differ in size, shape and number. For example, circular areas may be used to encode the information content of the first image and the area in between the circular areas may be used to encode the information content of the second image, such as in the example of FIG. 11.5. Another example is depicted in FIG. 11.6, where trapezoid shaped units are assigned to the information content of the first image and triangular shaped units are assigned to the information content of the second image. In areas comprising image units of different images the total area of image units encoding the information content of the different images may be different, such as, for example, the total area of the trapezoid units and triangular units of FIG. 11.6. This allows to control the optical contrast of the different images and therefore to balance the optical impression. For example, it is possible that one image appears very weak, whereas another image appears with a much higher contrast and is therefore dominant. For many applications the total area of image units assigned to the individual images is about the same. In cases, in which the total area of image units assigned to the individual images is not equally balanced, it is preferred that the ratio of the largest total area to the smallest total areas is 1.3:1 or higher, more preferred 1.6:1 or higher and most preferred 2:1 or higher.

In a further example, which uses a displacement polarizer, the character "A" as a first image and the character "B" as a second image can independently from each other be revealed at the same position of a retarder by shifting the displacement polarizer. The method of patterning the original pattern is depicted in FIGS. 12.1 to 12.5. In the example, the area 100 is divided in hexagonal image units assigned either to the first or to the second image, indicated by the number 1 for the first image inside hexagons 101 or the number 2 for the second image inside hexagons 102, respectively. FIG. 12.1 shows the desired shape and position 103 of the character "A" within the area of the hexagon matrix 100. FIG. 12.2 shows the desired shape and position 104 of the character "B" within the area of the hexagon matrix 100. FIG. 12.3 shows the original pattern in those hexagon units, which are assigned to the first image, whereas the hexagons assigned to the second image are indicated by the numeral 2. In the example of FIG. 12.3 those parts of the image units which overlap with the shape 103 of character "A" have a first orientation direction 106, whereas the non-overlapping areas have a second orientation direction 105. In the example of FIG. 12.3 the first and second directions are assumed to make an angle of about 45° with each other. Hexagon units which partially overlap with the character "A" may have a uniform orientation direction, for example determined by the larger of the overlapping or non-overlapping area. For better image resolution it is preferred to split the image units in overlapping and non-overlapping parts and apply the corresponding orientation direction, as this is indicated in the drawing of FIG. 12.3 by the different hatching directions, for example in hexagon 107.

In the same way, FIG. 12.4 shows the original pattern of the hexagon units which are assigned to the second image, whereas the hexagons assigned to the first image are indicated by the numeral 1. Those parts of the image units which overlap with the shape 104 of character "B" have a third orientation direction 109, whereas the non-overlapping areas have a fourth orientation direction 108. In the example of FIG. 12.4 the third and fourth directions are assumed to make an angle of about 45° with each other. For hexagon units which partially overlap with the character "B" the area is split in overlapping and non-overlapping parts and the corresponding orientation direction is indicated in the drawing of FIG. 12.4 by the corresponding hatching direction. The third orientation direction 109 is preferably oriented at an angle of about +22.5° or −22.5° with regard to the first orientation direction 106. The fourth orientation direction 108 is preferably oriented at an angle of +22.5° or −22.5° with regard to the second orientation direction 105.

The contours of the desired characters A and B in FIGS. 12.3 and 12.4 are only shown for illustration of the patterning concept but do not form part of the pattern, except of those boundaries which occur because of subdividing image units into overlapping and non-overlapping parts.

FIG. 12.5 shows the full original pattern, which results from patterning according to FIGS. 12.3 and 12.4. The shapes of the characters A and B are not shown anymore, with the exception of boundaries between areas of different orientation directions inside of image units that have been subdivided into overlapping and non-overlapping parts.

When a non-patterned polarizer is held above a retarder with the original pattern of FIG. 12.5, the character "A" is optimally visible for a first polarization direction and the character "B" is optimally visible for a second polarization direction of the polarizer. Both characters appear almost at the same position of the retarder. Because of the optical axis directions within the area of the characters and within the background, both characters appear as a positive image and as a negative image, depending on the orientation of the polarizer.

If, according to the invention, an encryption scheme is applied to the above original pattern and a non-patterned polarizer, the encryption scheme being designed such that the resulting patterned polarizer can be used as a displacement polarizer with at least four positions, then the above appearance of the characters "A" and "B" with positive and negative contrast are revealed by arranging and shifting the displacement polarizer above the retarder comprising the encrypted pattern. Hence two different images, both with positive and with negative contrast, can be revealed almost at the same position, by shifting the displacement polarizer along one direction.

In preferred embodiments of the invention, which use a displacement polarizer, the second image comprises at least parts, which can be constructed by scaling at least parts of the first image, wherein areas of the first and second image may overlap. Preferably, the overlapping areas are divided in image units, such that parts of the first, second or more images can be assigned to different image units as described above. The center of scaling may be inside or outside of the image. In this case the second image appears as an increased or reduced image of the related parts of the first image. Preferably, the pattern encodes for a third or more images, which appear when the displacement polarizer is shifted to a third or additional positions above a retarder comprising the pattern of the encrypted images. The assignment as first, second, third, fourth or higher number of image shall be such that it corresponds to the sequence of the appearance of the related images when shifting the displacement polarizer. Like the second image, the third or additional images comprise at least parts, which can be constructed by scaling at least parts of the first image, wherein areas of the first and third and optional additional images overlap. The center of scaling for the construction of the second, third and optionally additional images preferably coincide with each other. The scaling factors for the construction of the second, third and optionally additional images are different from each other. Preferably, the scaling factor increases or decreases monotonically with the sequence of the images. The optical effect that is perceived by an observer when moving the displacement polarizer above an encrypted retarder is that of zooming an image in or out, respectively.

FIGS. 13.1-13.4 show an example of a retarder comprising an encrypted pattern as described above, which provides a zooming effect upon arranging the displacement polarizer above the retarder and shifting it to four different positions along one direction. In the example, an encryption scheme has been applied to the original pattern and a non-patterned polarizer, wherein the encryption scheme is designed such that the resulting patterned polarizer can be used as a displacement polarizer with at least four positions. The retarder 115 comprises a first image 116, which is optimally visible for a first position of the displacement polarizer, illustrated in FIG. 13.1. The first image is the number 10 with a first size. In the original pattern the image is encoded by a first orientation direction. FIG. 13.1 also indicates a second image 117, a third image 118 and a fourth image 119 by its contours. The first, second, third and fourth images partially overlap with each other. Preferably, the images in overlapping areas are split up in image units, such that parts of the individual images can be assigned to different image units as described above. Each of the second, third and fourth images is constructed from the first image by a different scaling factor, such that the size of the images increases in the order of the images. The scaling center coincides with the center of the first image, but it may be at any other position as mentioned above. The first, second, third and fourth images, are encoded in the original pattern by areas with different orientation directions. The areas outside the numeral 10 may also be birefringent or not. For the first position of the displacement polarizer only the image 116 is optimally visible, whereas the images 117, 118 and 119 are only visible with a lower contrast compared to the first image 116 or are even not visible. By shifting the polarizer to a second position, the image 117 becomes optimally visible, as is illustrated in FIG. 13.2. By shifting the displacement polarizer into a third position, the third image 118 becomes optimally visible (FIG. 13.3) and the fourth image 119 becomes optimally visible at a fourth position of the displacement polarizer (FIG. 13.4). By shifting the displacement polarizer the four images become sequentially visible, which gives the impression of zooming in or out depending on the direction in which the polarizer is shifted.

In further preferred embodiments of the invention, which use a displacement polarizer, the second image comprises at least parts, which can be constructed by mirroring at least parts of the first image. The mirror line can be at any position and can have any direction. Further, the second image may be shifted relative to the first image. Accordingly, the second image may fully or partially overlap with the first image, even in case the mirror line is outside the area of the first image. Preferably the overlapping areas are divided in image units, such that parts of the first, second or additional images can be assigned to different image units as described above. FIGS. 14.1-14.4 show an example of an optical element 120 according to the invention, wherein the second image 122 in FIG. 14.2 is a mirror image of the first image 121 in FIG. 14.1 and both the first and the second image appear at the same position, but for different positions of the displacement polarizer. In the example, an encryption scheme has been applied to the original pattern and a non-patterned polarizer, wherein the encryption scheme is designed such that the resulting patterned polarizer can be used as a displacement polarizer with at least four positions. By moving the displacement polarizer in one direction, the observer can switch between the image and the mirror image. In addition, both the image and the mirror image appear as negative image 123, 124 in FIGS. 14.3 and 14.4 upon moving the displacement polarizer to additional positions. Having the image and the mirror image overlapping at the same position has the surprising effect that the image makes a transition to its mirror image. Of course, it is also possible to position the mirror image somewhere else in the retarder.

For avoidance of misunderstanding, the frames enclosing areas of different orientation in any of the drawings of the optical elements, the patterned polarizers and the observed images are for indicating the different areas only, but are itself not visible in a real device.

The optical elements which can be used for the security systems according to the invention may be operated in transmission or in reflection. For observation of patterned retarders in transmission, the light entering the retarder has to be polarized and the light which has passed the retarder has to be analyzed with a polarizer. The patterned polarizer according to the invention may be applied on either side of the optical element and can, therefore, act as a polarizer for providing polarized light or as an analyzer.

An optical element as part of the security system according to the invention preferably comprises a reflector on the side opposite to the side which is desired for observation.

There are technologies, methods and materials known for the production of retarders or polarizers with patterned orientation. For example, the retarders or polarizers may include a layer comprising polymerized or cross-linked liquid crystals with locally different optical axes directions. Such layers are, for example, prepared by applying cross-linkable liquid crystal materials on top of an alignment layer exhibiting locally different alignment directions. The liquid crystal material adopts the local alignment directions of the underlying alignment layer and is then cross-linked to fix the orientation. With regard to the preparation of such optical elements reference is made to WO09112206, which is hereby incorporated by reference.

The patterned polarizer used in the security system according to the invention may be a linear polarizer or a circular polarizer. A preferred circular polarizer according to the invention comprises a linear polarizer and a quarter wave retarder which has an orientation pattern. A preferred linear polarizer according to the invention comprises oriented dichroic dyes, preferably embedded in a liquid crystal material. Preparation methods of such elements are known in the art and may be similar to those mentioned above with reference to WO09112206.

According to a second aspect of the invention, there is provided a method for encoding and encrypting of information in an optical element used in the security system according to the invention. The method comprises designing an original pattern, which encodes an optical information in the form of an orientation pattern for a retarder or polarizer applying an encryption scheme comprising an encryption map and a related algorithm to the original pattern to further encrypt the encoded information design a pattern to be applied to a non-patterned linear or circular polarizer by using said encryption map with the same or another encryption algorithm as above.

The method may be extended by steps which create the encrypted original pattern in a retarder or polarizer for the optical element and which further produces a patterned linear or circular polarizer having the above designed pattern.

If a circular polarizer has to be patterned then preferably the circular polarizer comprises a linear polarizer and a quarter wave retarder, wherein the pattern is generated in the retarder.

For a patterned retarder or polarizer having an original pattern as an orientation pattern the encoded information would be visible when observed with non-patterned polarizer(s).

The invention claimed is:

1. An optical security system comprising:
an optical element with an anisotropic optical property, the optical element comprising a pattern formed by a pattern of the anisotropic optical property, wherein information is encoded and encrypted in the pattern of the optical element, and
a patterned polarizer having a pattern,
wherein both the optical element and the linear polarizer are encrypted by an encryption scheme based on an encryption map, in which there are zones, which have the same dimension along a first axis and which refer to different encryption algorithms and are further arranged periodically along the first axis, and
wherein, when the patterned polarizer is arranged above or below the optical element, the patterned polarizer is shiftable from a first position to a second position without rotation, such that the information in the pattern of the optical element is decrypted in the first position providing a first appearance and the encrypted information is decrypted in the second position providing a second appearance.

2. The optical security system according to claim 1, wherein the encryption is based on an encryption map and related encryption algorithms, and the same encryption map is used for encrypting the pattern which encodes the information in the optical element and for defining the pattern of the patterned polarizer.

3. The optical security system according to claim 2, wherein the encryption map does not contain part of the information to be encrypted.

4. The optical security system according to claim 2, wherein the applied encryption map comprises a periodic structure.

5. The optical security system according to claim 4, wherein the applied encryption map comprises a periodic structure in two directions.

6. The optical security system according to claim 2, wherein the applied encryption algorithm describes a continuous variation of an angle at least for one area of the encryption map.

7. The optical security system according to claim 2, wherein the applied encryption map comprises rectangular stripes.

8. The optical security system according to claim 1, wherein the image decrypted in the second position of the patterned polarizer appears with inverse contrast compared to the decrypted image in the first position.

9. The optical security system according to claim 1, wherein the patterned polarizer comprises a periodic modulation.

10. The optical security system according to claim 1, wherein the anisotropic optical property of the optical element refers to birefringence and the pattern of the anisotropic optical property comprises areas with different directions of the optical axes.

11. The optical security system according to claim 1, wherein the anisotropic optical property of the optical element refers to optical absorption which causes the optical element to act as a linear polarizer, and the pattern of the anisotropic optical property comprises areas with different polarization directions.

12. The optical security system according to claim 1, wherein the optical element is positioned on a substrate and the polarizer is positioned on the same substrate.

13. The optical security system according to claim 12, wherein the substrate is a banknote.

14. A method comprising:
providing an optical element with an anisotropic optical property, the optical element comprising a pattern formed by a pattern of the anisotropic optical property, wherein information is encoded and encrypted in the pattern of the optical element, and a patterned polarizer having a pattern, wherein both the optical element and the linear polarizer are encrypted by an encryption scheme based on an encryption map, in which there are zones, which have the same dimension along a first axis and which refer to different encryption algorithms and are further arranged periodically along the first axis; and
shifting the patterned polarizer arranged above or below the optical element from a first position to a second position without rotation, wherein the first and second positions are so selected that in both the first and second positions the information incorporated in the pattern of the optical element is decrypted and decoded.

15. A method for encoding and encrypting of information in an optical element, the method comprising:
designing an original pattern, which encodes an optical information in the form of an orientation pattern for a retarder or polarizer;
applying an encryption scheme comprising an encryption map and a related algorithm to the original pattern to further encrypt the encoded information;
designing a pattern to be applied to a non-patterned linear or circular polarizer by using an encryption scheme based on said encryption map with the same or another encryption algorithm as used for encrypting the optical information, wherein the encryption scheme for both the original pattern and the pattern to be applied to a non-patterned linear or circular polarizer is based on an encryption map, in which there are zones, which have the same dimension along a first axis and which refer to different encryption algorithms and are further arranged periodically along the first axis;

manufacturing a retarder or polarizer as an optical element having the encrypted original pattern; and manufacturing a patterned linear or circular polarizer having the pattern designed to be applied to a non-patterned linear or circular polarizer, wherein the pattern for the patterned linear or circular polarizer is such that, when the patterned linear or circular polarizer, respectively, is arranged above or below the optical element, the patterned linear or circular polarizer is shiftable from a first position to a second position without rotation, such that the information in the pattern of the optical element is decrypted in the first position providing a first appearance and the encrypted information is decrypted in the second position providing a second appearance.

* * * * *